United States Patent
Ashok et al.

(10) Patent No.: US 8,291,050 B2
(45) Date of Patent: Oct. 16, 2012

(54) METHOD, APPARATUS AND ARTICLE OF MANUFACTURE FOR CONFIGURING MULTIPLE PARTITIONS TO USE A SHARED NETWORK ADAPTER

(75) Inventors: Shamsundar Ashok, Austin, TX (US); Bryan Mark Logan, Rochester, MN (US); Christopher McNelis, Austin, TX (US); Joy Mei-Jen Underhill, Round Rock, TX (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 11/841,057

(22) Filed: Aug. 20, 2007

(65) Prior Publication Data

US 2007/0283286 A1    Dec. 6, 2007

Related U.S. Application Data

(63) Continuation-in-part of application No. 11/097,608, filed on Apr. 1, 2005, now Pat. No. 7,586,936.

(51) Int. Cl.
G06F 15/177 (2006.01)
(52) U.S. Cl. ........................ 709/220; 715/736
(58) Field of Classification Search .................. None
See application file for complete search history.

(56) References Cited

U.S. PATENT DOCUMENTS

| | | | |
|---|---|---|---|
| 5,442,802 A | | 8/1995 | Brent et al. |
| 5,506,975 A | * | 4/1996 | Onodera ............................ 718/1 |
| 5,821,937 A | * | 10/1998 | Tonelli et al. ................. 715/853 |
| 5,831,610 A | * | 11/1998 | Tonelli et al. ................. 715/735 |
| 5,983,274 A | | 11/1999 | Hyder et al. |
| 6,112,015 A | * | 8/2000 | Planas et al. .................. 709/223 |
| 6,229,540 B1 | * | 5/2001 | Tonelli et al. ................. 715/735 |
| 6,330,005 B1 | * | 12/2001 | Tonelli et al. ................. 715/735 |
| 6,751,229 B1 | | 6/2004 | Waller et al. |
| 6,795,870 B1 | | 9/2004 | Bass et al. |
| 6,822,968 B1 | | 11/2004 | Lim |
| 7,117,499 B2 | * | 10/2006 | Kawamoto et al. ........... 718/105 |
| 7,260,120 B2 | | 8/2007 | Kang et al. |
| 7,272,799 B2 | * | 9/2007 | Imada et al. .................. 715/767 |
| 7,274,706 B1 | | 9/2007 | Nguyen et al. |

(Continued)

OTHER PUBLICATIONS

Basso et al., "Network Communications for Operating System Partitions", U.S. Appl. No. 11/097,051, filed Apr. 1, 2005.

(Continued)

*Primary Examiner* — Jerry Dennison
(74) *Attorney, Agent, or Firm* — Patterson & Sheridan, LLP

(57) ABSTRACT

A graphical user interface, method, and apparatus for configuring a logical partition (LPAR), comprises one or more screens for configuring an LPAR having allocated resources residing on a server computer, the LPAR being uniquely identified by a partition ID; the one or more screens comprising an SNA selection element configured for user-selection of a shared network adapter (SNA) ID from one or more available SNA IDs, wherein each selectable SNA ID uniquely identifies a respective SNA installed on the server computer; a physical port selection element configured for user-selection of a physical port ID from one or more physical port IDs each corresponding to a respective physical port, wherein the one or more physical port IDs uniquely identify all physical ports residing on the respective SNA for the selected SNA ID; and an active configure button which, when selected by a user, causes the display of one or more screens for configuring a logical shared adapter (LSA) associated with the respective SNA.

20 Claims, 20 Drawing Sheets

U.S. PATENT DOCUMENTS

| | | | |
|---|---|---|---|
| 7,308,006 B1 | 12/2007 | Banerjee et al. | |
| 7,461,276 B2 * | 12/2008 | Imada et al. | 713/300 |
| 7,493,409 B2 * | 2/2009 | Craddock et al. | 709/238 |
| 7,586,936 B2 * | 9/2009 | Arimilli et al. | 370/463 |
| 7,633,955 B1 * | 12/2009 | Saraiya et al. | 370/401 |
| 7,721,285 B2 * | 5/2010 | Imada et al. | 718/1 |
| 7,797,416 B2 * | 9/2010 | Kinoshita et al. | 709/223 |
| 7,865,899 B2 * | 1/2011 | Kawamoto et al. | 718/105 |
| 7,873,693 B1 * | 1/2011 | Mehrotra et al. | 709/203 |
| 7,903,687 B2 | 3/2011 | Basso et al. | |
| 2002/0048270 A1 | 4/2002 | Allen et al. | |
| 2002/0173863 A1 * | 11/2002 | Imada et al. | 700/83 |
| 2004/0030766 A1 | 2/2004 | Witkowski | |
| 2004/0109465 A1 | 6/2004 | Kim et al. | |
| 2004/0128398 A1 | 7/2004 | Pettey | |
| 2005/0080869 A1 * | 4/2005 | Bender et al. | 709/212 |
| 2005/0080920 A1 * | 4/2005 | Bender et al. | 709/236 |
| 2005/0080933 A1 * | 4/2005 | Herring | 709/249 |
| 2005/0089034 A1 * | 4/2005 | Sakata et al. | 370/389 |
| 2005/0091383 A1 * | 4/2005 | Bender et al. | 709/228 |
| 2005/0265252 A1 * | 12/2005 | Banerjee et al. | 370/252 |
| 2006/0031600 A1 | 2/2006 | Ellis et al. | |
| 2006/0120289 A1 | 6/2006 | Cunningham | |
| 2006/0216958 A1 | 9/2006 | Yee et al. | |
| 2006/0230098 A1 * | 10/2006 | Shen et al. | 709/201 |
| 2007/0079103 A1 * | 4/2007 | Mimatsu | 711/173 |
| 2007/0192459 A1 * | 8/2007 | Horimoto et al. | 709/223 |
| 2007/0283286 A1 * | 12/2007 | Ashok et al. | 715/764 |
| 2008/0005343 A1 * | 1/2008 | Bauman et al. | 709/230 |
| 2008/0140877 A1 * | 6/2008 | Baba et al. | 710/23 |
| 2009/0055831 A1 * | 2/2009 | Bauman et al. | 718/104 |
| 2011/0080917 A1 * | 4/2011 | Stevenson et al. | 370/401 |

OTHER PUBLICATIONS

Basso et al., "Configurable Ports for a Host Ethernet Adapter", U.S. Appl. No. 11/097,652, filed Apr. 1, 2005.

Gainey et al., "Ethernet Adapter Packet Management", U.S. Appl. No. 11/621,097, filed Jan. 8, 2007.

Gainey et al., "Broadcast and Multicast Packet Management", U.S. Appl. No. 11/621,099, filed Jan. 8, 2007.

Basso et al., "System and Method for Multicore Communication Processing", U.S. Appl. No. 11/669,419, filed Jan. 31, 2007.

Kung, H.T., Gigabit Local Area Networks: A Systems Perspective, IEEE Communications Magazine, Apr. 1992, pp. 79-89, vol. 30, Issue 4, Piscataway, New Jersey, United States.

* cited by examiner

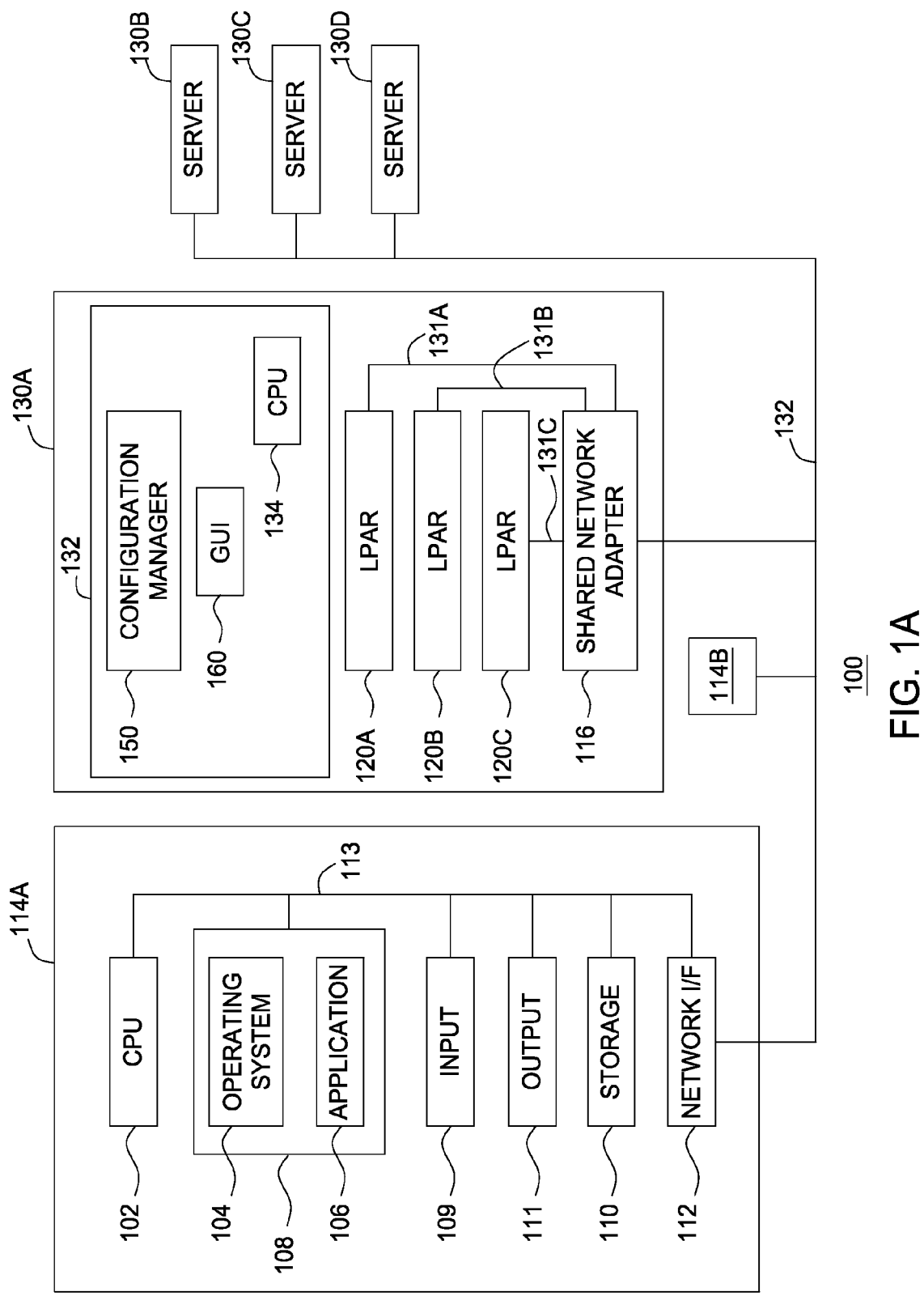

200

Logical Shared Adapter Configuration

Logical Port configuration

Use the fields below to specify Logical Ports and allowed VLAN IDs for physical port 0

702 — Chose Logical Ports

| Select | Logical Port ID | Owning Logical Partition | State |
|---|---|---|---|
| ○ | 1 | | available |
| ○ | 2 | | available |
| ○ | 3 | | available |
| ○ | 4 | | available |
| ○ | 5 | | available |
| ○ | 6 | | available |
| ○ | 7 | | available |
| ○ | 8 | | available |
| ○ | 9 | | available |
| ○ | 10 | | available |
| ○ | 11 | | available |
| ○ | 12 | | available |
| ○ | 13 | | available |
| ○ | 14 | | available |
| ○ | 15 | | available |
| ○ | 16 | | available |

| OK | Cancel | Help |
| 710 | 712 | 714 |

Logical Shared Adapter Configuration

Logical Port configuration

Use the fields below to specify Logical Ports and allowed VLAN IDs for physical port 0

702 — Chose Logical Ports

| Select | Logical Port ID (704) | Owning Logical Partition (706) | State (708) |
|---|---|---|---|
| ○ | 1 | | available |
| ○ | 2 | | available |
| ○ | 3 | | available |
| ○ | 4 | | available |
| ○ | 5 | | available |
| ○ | 6 | | available |
| ⦿ | 7 | | available |
| ○ | 8 | | available |
| ○ | 9 | | available |
| ○ | 10 | | available |
| ○ | 11 | | available |
| ○ | 12 | | available |
| ○ | 13 | | available |
| ○ | 14 | | available |
| ○ | 15 | | available |
| ○ | 16 | | available |

OK (710)  Cancel (712)  Help (714)

Logical Shared Adapter Configuration

Logical Port configuration

Use the fields below to specify Logical Ports and allowed VLAN IDs for physical port 0

702 — Chose Logical Ports

| Select | Logical Port ID | Owning Logical Partition | State |
|---|---|---|---|
| ○ | 1 | | available |
| ○ | 2 | | available |
| ○ | 3 | | available |
| ○ | 4 | | available |
| ○ | 5 | | available |
| ○ | 6 | | available |
| ○ | 7 | | available |
| ○ | 8 | | available |
| ○ | 9 | | available |
| ○ | 10 | | available |
| ○ | 11 | | available |
| ⦿ | 12 | | available |
| ○ | 13 | | available |
| ○ | 14 | | available |
| ○ | 15 | | available |
| ○ | 16 | | available |

704, 706, 708

OK (710)   Cancel (712)   Help (714)

Logical Shared Adapter Configuration

Logical Port configuration

Use the fields below to specify Logical Ports and allowed VLAN IDs for physical port 0

702 — Chose Logical Ports

| Select | Logical Port ID | Owning Logical Partition | State |
|---|---|---|---|
| ○ | 1 | | available |
| ○ | 2 | | available |
| ○ | 3 | | available |
| ○ | 4 | | available |
| ○ | 5 | | available |
| ○ | 6 | | available |
| ○ | 7 | | available |
| ○ | 8 | | available |
| ○ | 9 | | available |
| ○ | 10 | | available |
| ○ | 11 | | available |
| ○ | 12 | | available |
| ○ | 13 | | available |
| ○ | 14 | | available |
| ○ | 15 | | available |
| ○ | 16 | | available |

704, 706, 708

☐ Allow all VLAN IDs — 1302

VLAN to add: [  ] — 1304    [Add] — 1306

Allowed VLAN IDs: [  ] — 1310    [Remove] — 1308

[OK] [Cancel] [Help]
 710  712   714

METHOD, APPARATUS AND ARTICLE OF MANUFACTURE FOR CONFIGURING MULTIPLE PARTITIONS TO USE A SHARED NETWORK ADAPTER

CROSS-REFERENCE TO RELATED APPLICATIONS

This application is a continuation in part of U.S. patent application Ser. No. 11/097,608, entitled "Host Ethernet Adapter for Networking Offload in Server Environment," filed Apr. 1, 2005 now U.S. Pat. No. 7,586,936. This related patent application is herein incorporated by reference in its entirety.

BACKGROUND OF THE INVENTION

1. Field of the Invention

The field of the invention relates to network adapters, specifically to a method for configuring multiple partitions to use a shared network adapter.

2. Description of the Related Art

A network adapter (NA) is a piece of computer hardware designed to enable computers to communicate over computer networks. Typically, NAs provide physical access to a networking medium and a low-level addressing system for sending and receiving network traffic.

Server computers generally are single devices with resources for computer processing, including processors, memory and storage. Typically, a server device with significant resources is divided up into logical partitions. (LPARs). One LPAR behaves as a single system with control over the resources allocated to the particular LPAR. When a server device is connected to a network, each LPAR may use network communications, and accordingly require NAs to send and receive network traffic. However, even though operating within a single device, NAs typically are not designed to handle network traffic for more than one system. Accordingly, one NA must be installed for each LPAR.

Installing multiple NAs on a single device requires greater resources in terms of real estate within the device, and energy requirements. Additional NA cards take up valuable space within tightly condensed components of a server, and require additional energy to both run the additional NA's and to keep the server's components within a range of safe operating temperatures. Further, each additional adapter adds to the load on the server's peripheral component interconnect (PCI) buses, which is detrimental to the server's overall performance.

Shared network adapters (SNAs), on the other hand, bypass the PCI buses, and route traffic on a private bus directly to a processor. Further, SNAs reduce the need to rely on multiple NAs for network communications on one server device. SNAs are designed to facilitate network communications for multiple systems. Accordingly, one SNA can handle network communications for each LPAR on a server, potentially enabling all the LPARs on a single server device to send and receive network traffic on one SNA, instead of requiring one NA for each LPAR. Accordingly, there is a need for a method to configure multiple partitions for a shared network adapter.

SUMMARY OF THE INVENTION

The present invention generally includes a graphical user interface (GUI), comprising one or more screens for configuring a logical partition (LPAR) having allocated resources residing on a server computer, the LPAR being uniquely identified by a partition ID; the one or more screens comprising an SNA selection element configured for user-selection of a shared network adapter (SNA) ID from one or more available SNA IDs, wherein each selectable SNA ID uniquely identifies a respective SNA installed on the server computer; a physical port selection element configured for user-selection of a physical port ID from one or more physical port IDs each corresponding to a respective physical port, wherein the one or more physical port IDs uniquely identify all physical ports residing on the respective SNA for the selected SNA ID; and an active configure button which, when selected by a user, causes the display of one or more screens for configuring a logical shared adapter (LSA) associated with the respective SNA.

According to one embodiment of the invention, a GUI comprises one or more screens for configuring a logical shared adapter (LSA) associated with a shared network adapter (SNA), the one or more screens comprising a plurality of logical port ID selection elements configured for user selection of a logical port ID from a plurality of logical port IDs, wherein the plurality of logical port IDs uniquely identifies all logical ports associated with a physical port residing on the SNA; and an active OK button which, when selected by a user causes a configuration of the LSA according to the selected logical port ID and the physical port.

According to one embodiment of the invention, a method of configuring a logical partition (LPAR), comprises displaying a graphical user interface (GUI) for configuring an LPAR having allocated resources residing on a server computer, the LPAR being uniquely identified by a partition ID; receiving user input selecting a shared network adapter (SNA) ID from one or more available SNA IDs displayed in an SNA selection screen area of the GUI, wherein each selectable SNA ID uniquely identifies a respective SNA installed on the server computer; receiving user input selecting a physical port ID from one or more physical port IDs, each corresponding to a respective physical port, displayed in a physical port selection screen area of the GUI, wherein the one or more physical port IDs uniquely identify all physical ports residing on the respective SNA for the selected SNA ID; receiving user input selecting an active configure button; and in response to selection of the active configure button, displaying of one or more screens of the GUI for configuring a logical shared adapter (LSA) associated with the respective SNA.

According to one embodiment of the invention, an apparatus for configuring a logical partition (LPAR) comprises a processor; and a memory containing a GUI application, which when executed by the processor displays one or more screens for configuring an LPAR having allocated resources residing on a server computer, the LPAR being uniquely identified by a partition ID; the one or more screens comprising an SNA selection element configured for user-selection of a shared network adapter (SNA) ID from one or more available SNA IDs, wherein each selectable SNA ID uniquely identifies a respective SNA installed on the server computer; a physical port selection element configured for user-selection of a physical port ID from one or more physical port IDs each corresponding to a respective physical port, wherein the one or more physical port IDs uniquely identify all physical ports residing on the respective SNA for the selected SNA ID; and an active configure button which, when selected by a user, causes the display of one or more screens for configuring a logical shared adapter (LSA) associated with the respective SNA.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It should be noted, however, that the appended drawings illustrate only typical embodiments of this invention and are therefore not to be considered limiting of its scope, for the invention may admit to other equally effective embodiments.

FIG. 1A depicts a block diagram of a networked system in which embodiments of the present invention may be implemented.

FIG. 7A illustrates a GUI, according to one embodiment of the invention.

FIG. 7B illustrates a GUI, according to one embodiment of the invention.

FIG. 10B illustrates a GUI, according to one embodiment of the invention.

FIG. 13 illustrates a GUI, according to one embodiment of the invention.

DETAILED DESCRIPTION OF THE PREFERRED EMBODIMENTS

Figure 1B:
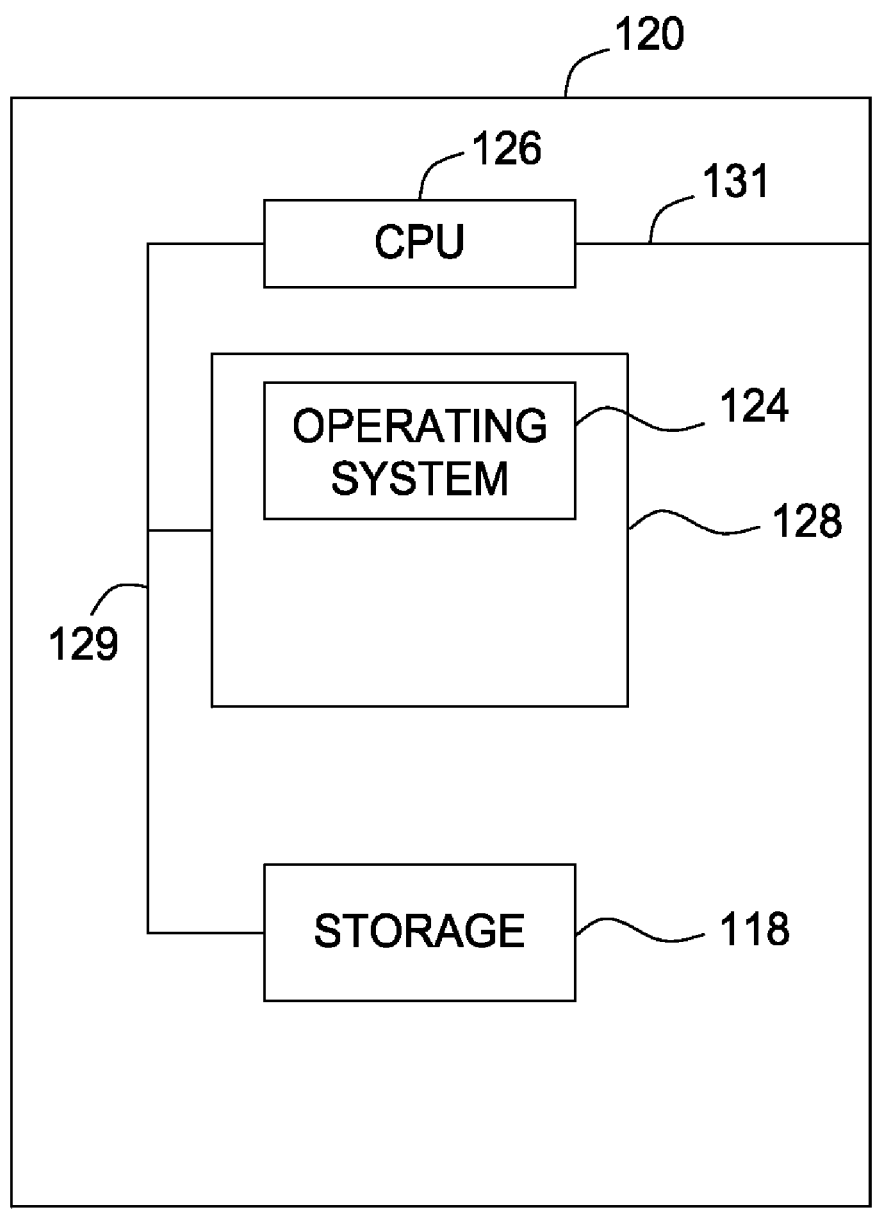
FIG. 1B illustrates a logical partition, according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1A depicts a block diagram of networked system 100 in which embodiments of the present invention may be implemented. In general, the networked system 100 includes a client (e.g., user's) computer (two such client computers 114A-B are shown; also separately (and collectively) referred to as client computer(s) 114) and at least one server computer (four such server computers 130A-D are shown; also separately (and collectively) referred to as server computer(s) 130, or just server(s) 130). Client computer 114A and server 130A are representative of one particular embodiment of a client and server, respectively. The client computer 114A and server computer 130A are connected via a network 132. In general, the network 132 may be a local area network (LAN) and/or a wide area network (WAN). In a particular embodiment, the network 132 is the Internet. Servers 130 may be network servers, web servers, or any other server that uses a shared network adapter (SNA) 116 to communicate with client computers 114 and other servers 130 over network 132.

The client computer 114A includes a Central Processing Unit (CPU) 102 connected via a bus 113 to a memory 108, storage 110, an input device 109, an output device 111, and a network interface device 112. The input device 109 can be any device to give input to the client computer 114A. For example, a keyboard, keypad, light pen, touch-screen, trackball, or speech recognition unit, audio/video player, and the like could be used. The output device 111 can be any device to give output to the user, e.g., any conventional display screen or set of speakers, along with their respective interface cards, i.e., video cards and sound cards (not shown). Although shown separately from the input device 109, the output device 111 and input device 109 could be combined. For example, a display screen with an integrated touch-screen, a display with an integrated keyboard, or a speech recognition unit combined with a text speech converter could be used.

The network interface device 112 may be any entry/exit device configured to allow network communications between the client computer 114A and the server computers 130 via the network 132. For example, the network interface device 112 may be a network adapter or other network interface card (NIC).

Storage 110 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 108 and storage 110 could be part of one virtual address space spanning multiple primary and secondary storage devices.

The client computer 114A is generally under the control of an operating system 104, which is shown in the memory 108. Illustrative operating systems, which may be used to advantage, include Linux® and Microsoft Windows®.

The memory 108 is preferably a random access memory sufficiently large to hold the necessary programming and data structures of client applications. While the memory 108 is shown as a single entity, it should be understood that the memory 108 may in fact comprise a plurality of modules, and that the memory 108 may exist at multiple levels, from high speed registers and caches to lower speed but larger DRAM chips.

Illustratively, the memory 108 includes an application 106 that, when executed on CPU 102, provides support for exchanging information between the various servers 130 and locating network addresses at one or more of the servers 130. In one embodiment, the application 106 is a browser that includes a web-based Graphical User Interface (GUI), which allows the user to navigate and display web-pages located on the Internet. However, more generally the application may be a thin client application configured to transfer data (e.g., HTML, XML, etc.) between the client computer 114A and the servers 130 via, for example, HTTP.

Server computer 130A generally contains logical partitions (LPARs) 120, shared network adapter 116, memory 132, CPU 134, configuration manager 150, and graphical user interface (GUI) 160. An LPAR 120 is an allocation of resources (e.g., memory, processors, storage, etc.) within a server 130A. Although three LPARs are illustrated in FIG. 1B, the number of LPARs on any one server 130 is limited only by the resources available on server 130. LPARs 120 may be managed by a partition manager (not shown), which is referred to as a Hypervisor in some systems. A more particular embodiment of an LPAR 120 will be described below with respect to FIG. 1B.

The SNA 116 is connected to each LPAR 120 by individual private buses 131. Private buses 131 provide accelerated communications between shared network adapter 116 and LPARs 120 via a dedicated bus, wherein communications are unimpeded by other bus traffic passing over the separate PCI bus 129.

Although it is shown as a single unit, SNA 116 could include one or more SNAs. According to one embodiment of the invention, the communication requirements for all the LPARs 120 on a server 130 may exceed the communication resources of a single SNA. In such a case, a server 130 could include multiple SNAs, each handling network traffic for multiple LPARs 120.

Configuration manager 150 interfaces with GUI 160 to configure SNA 116 to handle network traffic for multiple LPARs. The memory 132 may be a random access memory sufficiently large to hold the necessary programming and data structures that are located on server 130. The programming and data structures may be accessed and executed by the CPU 134 as needed during operation. Although it is shown as a single unit, memory 132 could be a combination of fixed and/or removable storage devices, such as fixed disc drives, floppy disc drives, tape drives, removable memory cards or optical storage. The memory 132 could be part of one virtual address space spanning multiple primary and secondary storage devices.

FIG. 1B illustrates logical partition 120 of FIG. 1A, according to one embodiment of the invention. Each LPAR 120 contains a CPU 126, a memory 128, and a storage device 118, coupled to one another by a bus 129. Although it is shown as a single unit, CPU 126 could include one or more processors.

The memory 128 contains an operating system 124. Examples of operating systems are Linux®, AIX®, and i5/OS®, although other operating systems could potentially be implemented. Further, according to one embodiment of the invention, distinct LPARs on a server 130A could contain different operating systems 133. The memory 128 may be a random access memory sufficiently large to hold the necessary programming and data structures that are located on LPAR 120. The programming and data structures may be accessed and executed by the CPU 126 as needed during operation.

Storage 118 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 128 and storage 118 could be part of one virtual address space spanning multiple primary and secondary storage devices.

Figure 2A:
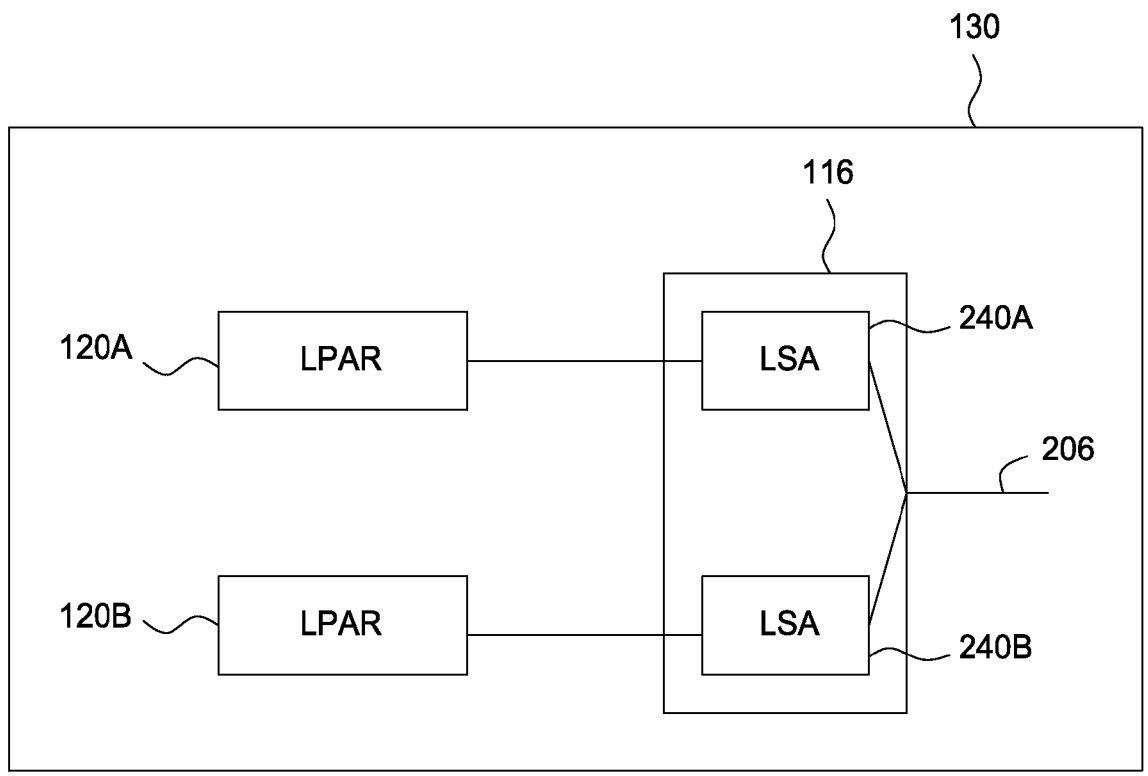
FIG. 2A illustrates a server, according to one embodiment of the invention.

FIG. 2A illustrates additional features of server 130, according to one embodiment of the invention. Server 130 contains SNA 116, which includes a physical port 206, and is configured with logical shared adapters (LSAs) 240A and 240B. SNAs use LSAs to keep communications from distinct LPARs 120 isolated from each other, in terms of both physical resources on the SNA 116 and security. Each LSA 240 handles network traffic for one LPAR 120. The lines connecting LPARs 120 and LSAs 240 represent the relationships wherein the LSAs 240A and 240B receive and send network traffic for the LPARs 120A and LPAR 120B, respectively.

As shown in FIG. 2A, LSAs 240A and 240B are also assigned to physical port 206. Accordingly, all communication traffic for LPARs 120A and 120B pass via LSAs 240A and 240B through physical port 206.

Figure 2B:
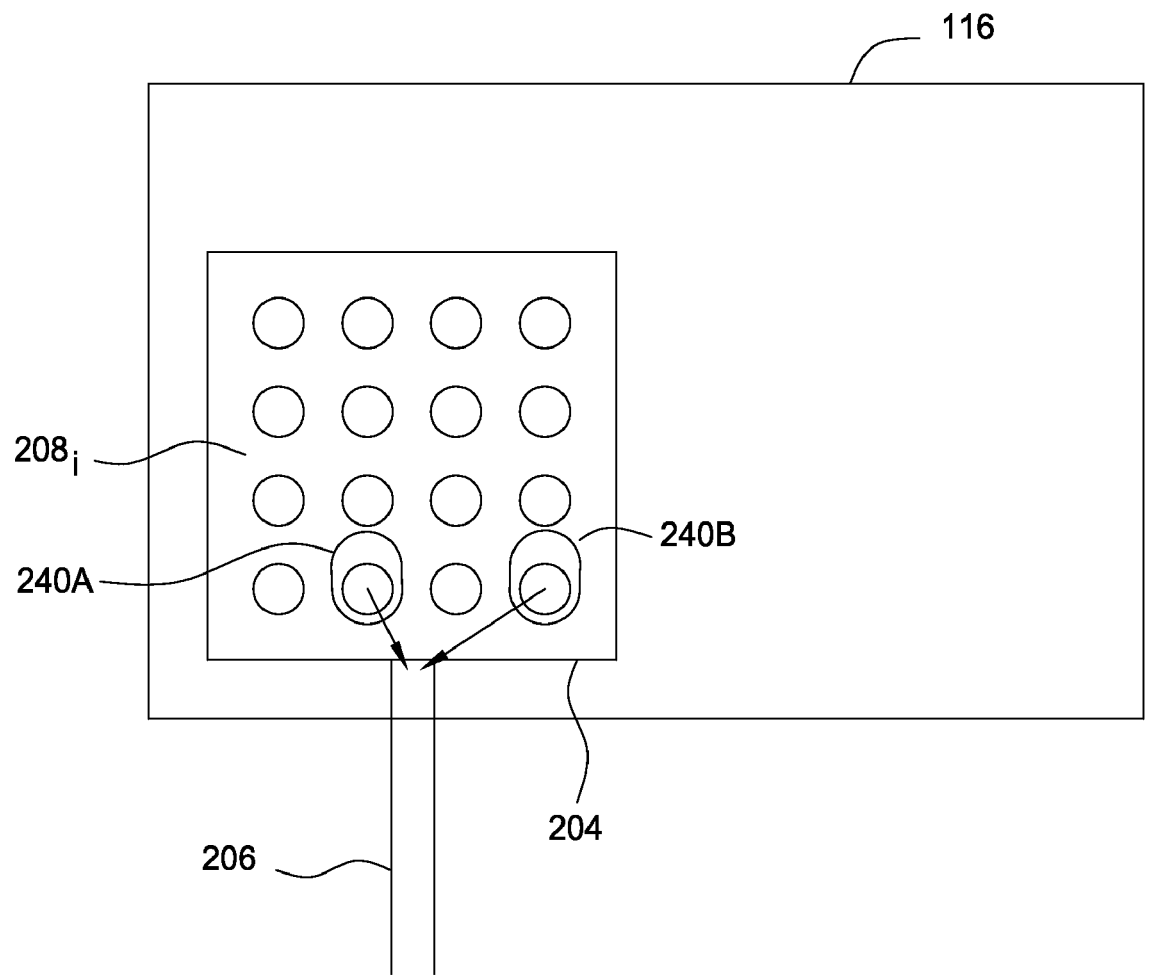
FIG. 2B illustrates a view of a shared network adapter 116, according to one embodiment of the invention.

FIG. 2B illustrates a view of a shared network adapter 116, according to one embodiment of the invention. Shared network adapter 116 consists of a port group 204 and physical port 206. Physical port 206 couples network adapter 116 to a network, according to the description of network 132 in FIG.

1A. A port group 204 is a collection of logical ports 208 and one or more physical ports 206. A logical port 208 is distinct from a physical port 206 in that logical ports 208 each represent a segment of bandwidth available on a physical port 206.

Although as shown, SNA 116 contains only one port group 204 and one physical port 206, an SNA 116 typically has more than one port group 204 and physical port 206 in a given implementation. Further, each port group 204 may include more than one physical port 206, as described below in FIGS. 3A-4B.

LSAs 240 are logical configurations of SNA 116 resources, such as the logical ports 208, the port groups 204, and the physical port 206. A user allocates one or more logical ports 208 to an LSA 240. Additionally, the user assigns each logical port 208 to one physical port 206 wherein one port group 204 contains both the logical port 208 and the physical port 206 to which the logical port 208 is assigned.

For example, in FIG. 2B, the LSAs 240A and 240B represent the LSA 240 to which the logical ports 208 are allocated. Further, the two distinct logical ports 208 allocated to LSAs 240A and 240B are each assigned to a physical port 206, as illustrated by the lines connecting logical ports 208 with physical port 206. It should be noted that port group 204 contains both the logical port 208 and the physical port 206 to which the logical port 208 is assigned.

Each logical port 208 within an LSA 240 shown in FIG. 2B is represented in FIG. 2A as one line connecting the respective LSA 240 with an LPAR 120. Accordingly, for the logical port 208 in LSA 240A of FIG. 2B, there is one line in FIG. 2A connecting LSA 240A with LPAR 120A. Similarly, for the logical port 208 in LSA 240B of FIG. 2B, there is one line in FIG. 2A connecting LSA 240B with LPAR 120B.

Further, for each logical port 208 within an LSA 240, assigned to a physical port 206 in FIG. 2B, there is one line in FIG. 2A connecting the LSA 240 to the physical port 206, to which the logical port 208 is assigned. Accordingly, in FIG. 2B, LSA 240A contains one logical port 208, assigned to physical port 206. Therefore, in FIG. 2A, there is one line connecting LSA 240A to physical port 206.

Similarly in FIG. 2B, LSA 240B contains one logical port 208, assigned to physical port 206. Therefore, in FIG. 2A, there is one line connecting LSA 240B to physical port 206.

Other configurations of a shared network adapter are also possible. For example, FIGS. 3 and 4 illustrate possible configurations for SNAs in embodiments of the invention.

Figure 3A:
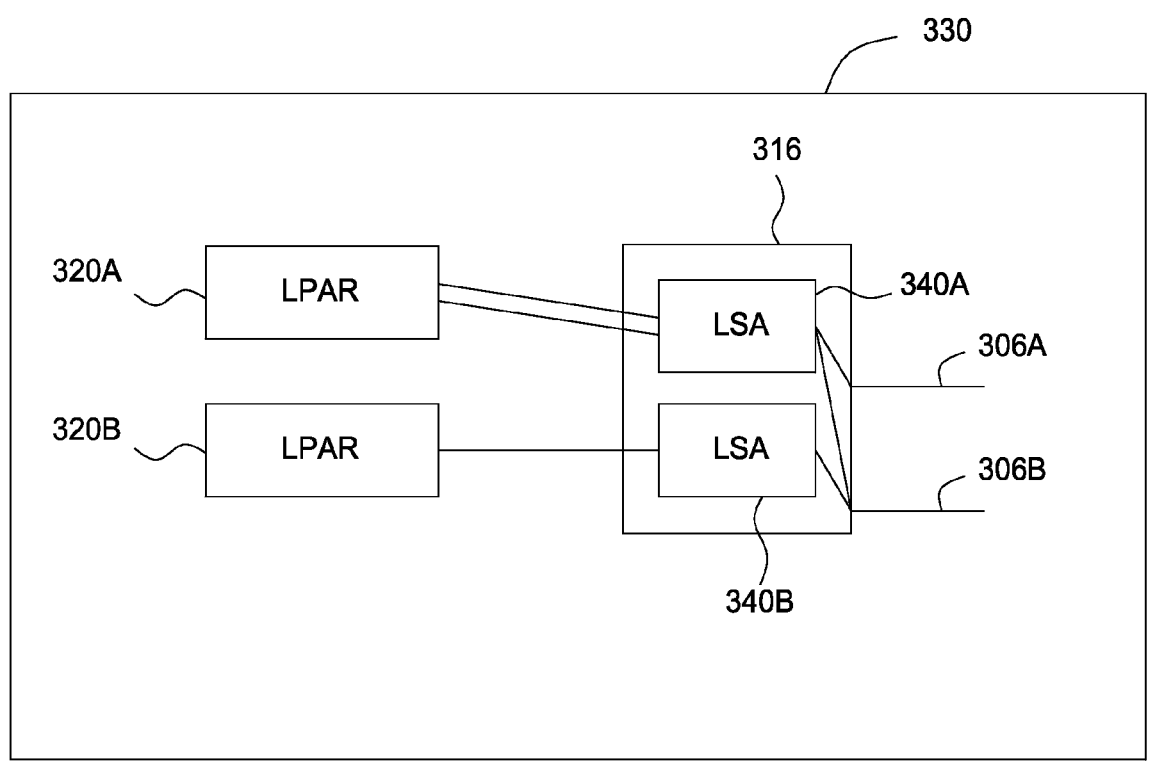
FIG. 3A illustrates a view of a server, according to one embodiment of the invention.

Referring first to FIG. 3A, an embodiment of server 330 is illustrated in which an SNA 316 is configured, which includes physical ports 306A and 306B, and is configured with logical shared adapters (LSAs) 340A and 340B. Each LSA 340 handles network traffic for one LPAR 320. The lines connecting LPARs 320 and LSAs 340 represent the relationships wherein the LSAs 340A and 340B receive and send network traffic for the LPARs 320A and LPAR 320B, respectively.

As shown in FIG. 3A, LSA 340A is assigned to physical ports 306A and 306B. Accordingly, all communication traffic for LPAR 320A passes via LSA 340A through physical ports 306A and 306B. Similarly, LSA 340B is assigned to physical port 306B. Accordingly, all communication traffic for LPAR 320B passes via LSA 340B through physical port 306B.

Figure 3B:
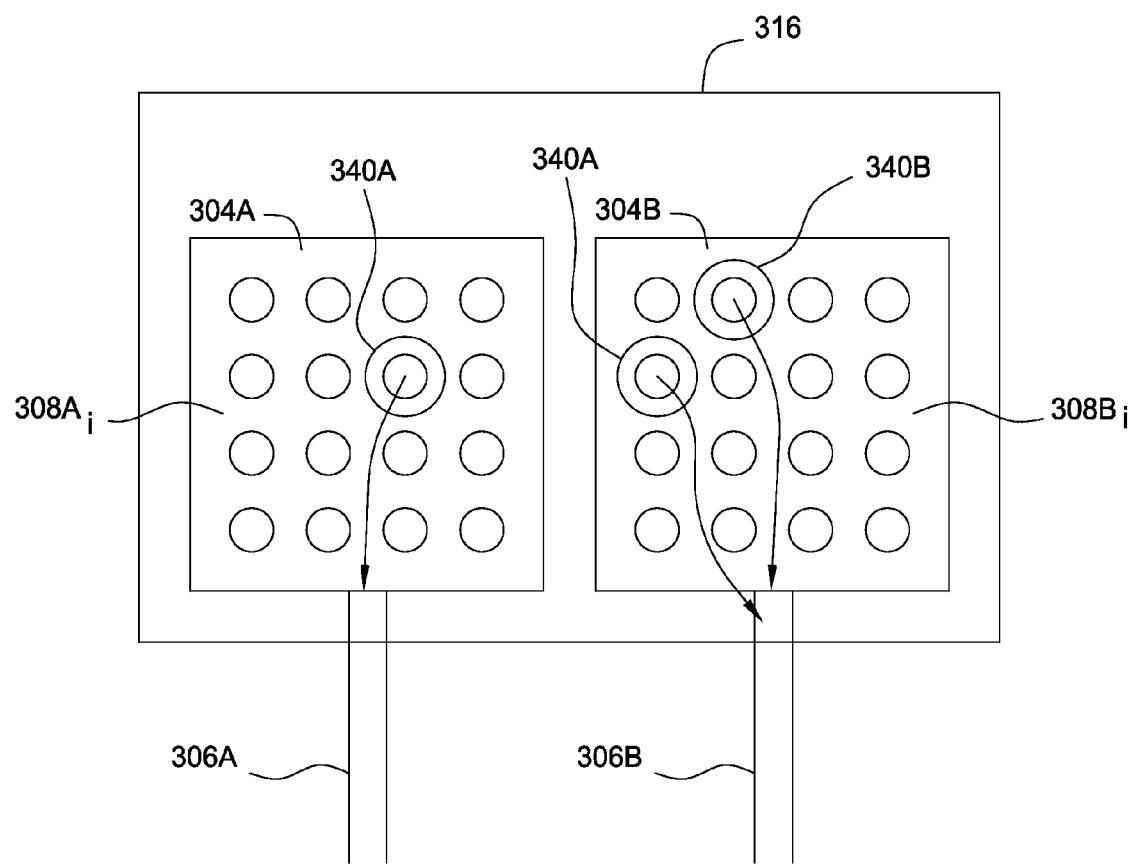
FIG. 3B illustrates a view of a shared network adapter, according to one embodiment of the invention.

FIG. 3B illustrates a view of a shared network adapter 316, according to one embodiment of the invention. As shown in FIG. 3B, an SNA 316 may contain more than one port group 304 and physical port 306 in a given implementation. Shared network adapter 316 consists of port groups 304 and physical ports 306. Physical ports 306 couple network adapter 316 to a network, according to the description of network 132 in FIG. 1A. A port group 304 is a collection of logical ports 308 and one or more physical ports 306. A logical port 308 is distinct from a physical port 306 in that logical ports 308 each represent a segment of bandwidth available on physical port 306.

LSAs 340 are logical configurations of SNA 316 resources, such as the logical ports 308, the port groups 304, and the physical ports 306. A user allocates one or more logical ports 308 to an LSA 340. Additionally, the user assigns each logical port 308 within an LSA 340 to one physical port 306 wherein one port group 304 contains both the logical port 308 and the physical port 306 to which the logical port 308 is assigned.

For example, in FIG. 3B, the LSAs 340A and 340B contain the logical ports 308 to which the LSAs 340A and 340B are allocated. More specifically, LSA 340A contains two logical ports 308A and 308B, one each in port groups 304A and 304B, respectively. Further, the two distinct logical ports 308A and 308B allocated to LSA 340A are assigned to physical ports 306A and 306B, respectively, as illustrated by the lines connecting logical ports 308A and 308B with physical ports 306A and 306B, respectively. It should be noted that port group 304A contains both the logical port 308A and the physical port 306A to which the logical port 308A is assigned. Similarly, port group 304B contains both the logical port 308B and the physical port 306B to which the logical port 308B is assigned.

Each logical port 308 within an LSA 340 shown in FIG. 3B, is represented in FIG. 3A as one line connecting the respective LSA 340 with an LPAR 320. Accordingly, for the logical ports 308A and 308B shown in LSA 340A of FIG. 3B, there are two lines in FIG. 3A connecting LSA 340A with LPAR 320A. Similarly, for the one logical port 308B in LSA 340B of FIG. 3B, there is one line connecting LSA 340B with LPAR 120B in FIG. 3A.

Further, for each logical port 308 in an LSA 340, assigned to a physical port 306 in FIG. 3B, there is one line in FIG. 3A connecting the LSA 340 to the physical port 306, to which the logical port 308 is assigned. In FIG. 3B, LSA 340A contains two logical ports 308A and 308B, assigned to physical ports 306A and 306B, respectively. Accordingly, in FIG. 3A, there is one line connecting LSA 340A to physical port 306A, and one line connecting LSA 340A to physical port 306B.

Similarly in FIG. 3B, LSA 340B contains one logical port 308B, assigned to physical port 306B. Accordingly, in FIG. 3A, there is one line connecting LSA 340B to physical port 306B.

Figure 4A:
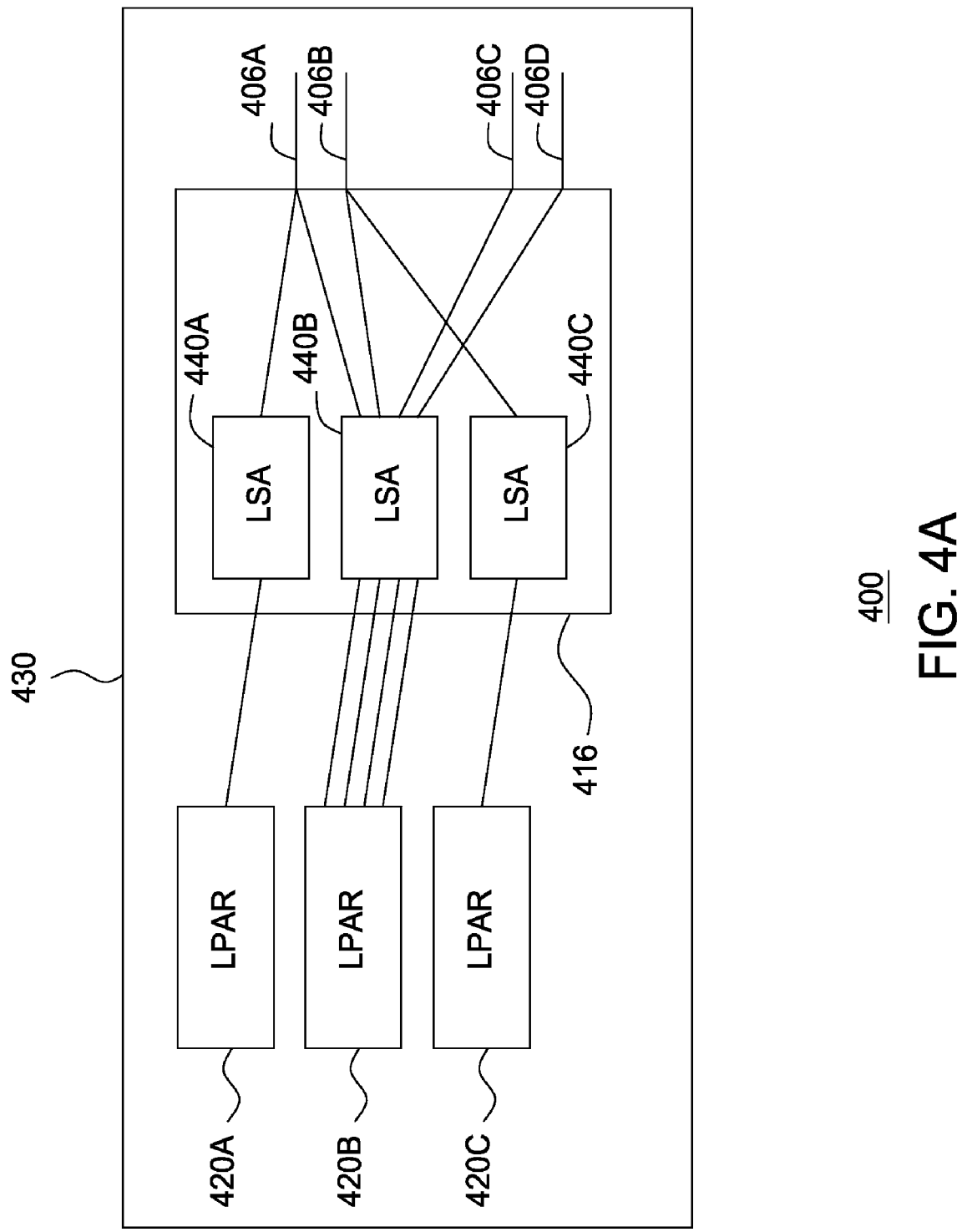
FIG. 4A illustrates a view of a server, according to one embodiment of the invention.

FIG. 4A illustrates a view of server 430, according to one embodiment of the invention. As is shown, server 430 contains an SNA 416, which includes physical ports 406A-D, and is configured with logical shared adapters (LSAs) 440A, 440B and 440C. Each LSA 440 handles network traffic for one LPAR 420. The lines connecting LPARs 420 and LSAs 440 represent the relationships wherein the LSAs 440A-C receive and send network traffic for the LPARs 420A-C, respectively.

As shown in FIG. 4A, LSA 440A is assigned to physical port 406A. Accordingly, all communication traffic for LPAR 420A passes via LSA 440A through physical port 406A. Similarly, LSA 440B is assigned to physical ports 406A-D. Accordingly, all communication traffic for LPAR 420B passes via LSA 440B through physical ports 406A-D. Further, LSA 440C is assigned to physical port 406B. Accordingly, all communication traffic for LPAR 420C passes via LSA 440C through physical port 406B.

Figure 4B:
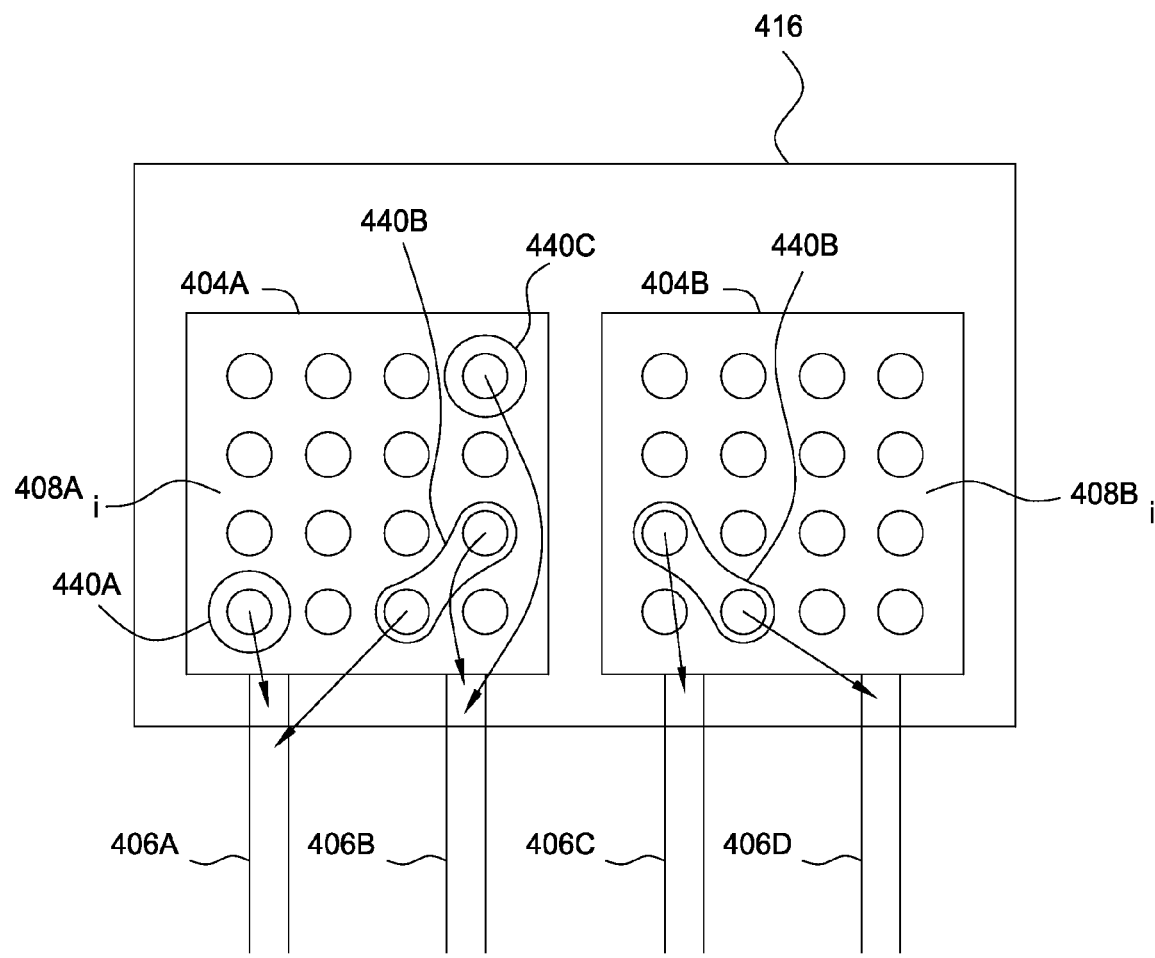
FIG. 4B illustrates a view of a shared network adapter, according to one embodiment of the invention.

FIG. 4B illustrates a view of a shared network adapter 416, according to one embodiment of the invention. As shown in FIG. 4B, an SNA 416 may contain more than one port group 404 and physical port 406 in a given implementation. Further, each port group 404 includes more than one physical port 406.

Shared network adapter 416 consists of port groups 404 and physical ports 406. Physical ports 406 couple network adapter 416 to a network, according to the description of network 132 in FIG. 1A. A port group 404 is a collection of logical ports 408 and one or more physical ports 406. A logical port 408 is distinct from a physical port 406 in that logical ports 408 each represent a segment of bandwidth available on the physical ports 406 contained within the same port group 404 ad the logical ports 408. More specifically, logical ports 408A each represent a segment of bandwidth available on physical ports 406A and 406B. Similarly, logical ports 408B each represent a segment of bandwidth available on physical ports 406C and 406D.

LSAs 440 are logical configurations of SNA 416 resources, such as the logical ports 408, the port groups 404, and the physical ports 406. A user allocates one or more logical ports 408 to an LSA 440. Additionally, the user assigns each logical port 408 within an LSA 440 to one physical port 406 wherein one port group 404 contains both the logical port 408 and the physical port 406 to which the logical port 408 is assigned.

For example, in FIG. 4B, the LSAs 440A-C contain the logical ports 408 to which the LSAs 440A-C are allocated. More specifically, LSA 440A contains one logical ports 408A, in port group 404A. Further, the logical port 408A allocated to LSA 440A is assigned to physical port 406A, as illustrated by the line connecting logical ports 408A with physical ports 406A. It should be noted that port group 404A contains both the logical port 408A and the physical port 406A to which the logical port 408A is assigned.

Similarly in FIG. 4B, the LSA 440B contains four logical ports (two logical ports 408A and two logical ports 408B). Further, the two logical ports 408A allocated to LSA 440B are each assigned to one of the physical ports 406A and 406B. Similarly, the two logical ports 408B allocated to LSA 440B are each assigned to one of the physical ports 406C and 406D. It should be noted that port group 404A contains both the logical ports 408A and the physical ports 406A and 406B, to which the logical ports 408A are assigned. Similarly, port group 404B contains both the logical ports 408B and the physical ports 406C and 406D, to which the logical ports 408B are assigned.

Each logical port 408 within an LSA 440 shown in FIG. 4B is represented in FIG. 4A as one line connecting the respective LSA 440 with an LPAR 120. Accordingly, for the one logical port 408A in LSA 440A of FIG. 4B, there is one line connecting LSA 440A with LPAR 420A in FIG. 4A. Similarly, for the four logical ports 408 shown in LSA 440B of FIG. 4B, there are four lines in FIG. 4A connecting LSA 440A with LPAR 420A.

Further, for each logical port 408 in an LSA 440, assigned to a physical port 406 in FIG. 4B, there is one line in FIG. 4A connecting the LSA 440 to the physical port 406, to which the logical port 408 is assigned. For example, in FIG. 4B, LSA 440A contains one logical port 408A, assigned to physical port 406A. Accordingly, in FIG. 4A, there is one line connecting LSA 440A to physical port 406A.

Similarly in FIG. 4B, LSA 440B contains four logical ports 408, assigned to physical ports 406A-D. Accordingly, in FIG. 4A, there is one line connecting LSA 440B to physical port 406A, one line connecting LSA 440B to physical port 406B, one line connecting LSA 440B to physical port 406C, and one line connecting LSA 440B to physical port 406D.

It should be noted that FIGS. 2-4 are provided merely as examples of specific embodiments of shared network adapters 200, 300, and 400. To one skilled in the art, it is apparent that there are an expansive set of configurations possible of port groups, logical ports, and physical ports on a shared network adapter. Any particular embodiment of the invention is not limited to configurations as described above, but only to a shared network adapter with one or more port groups, each port group containing a number of logical ports, and coupled to one or more physical ports.

Figure 5:
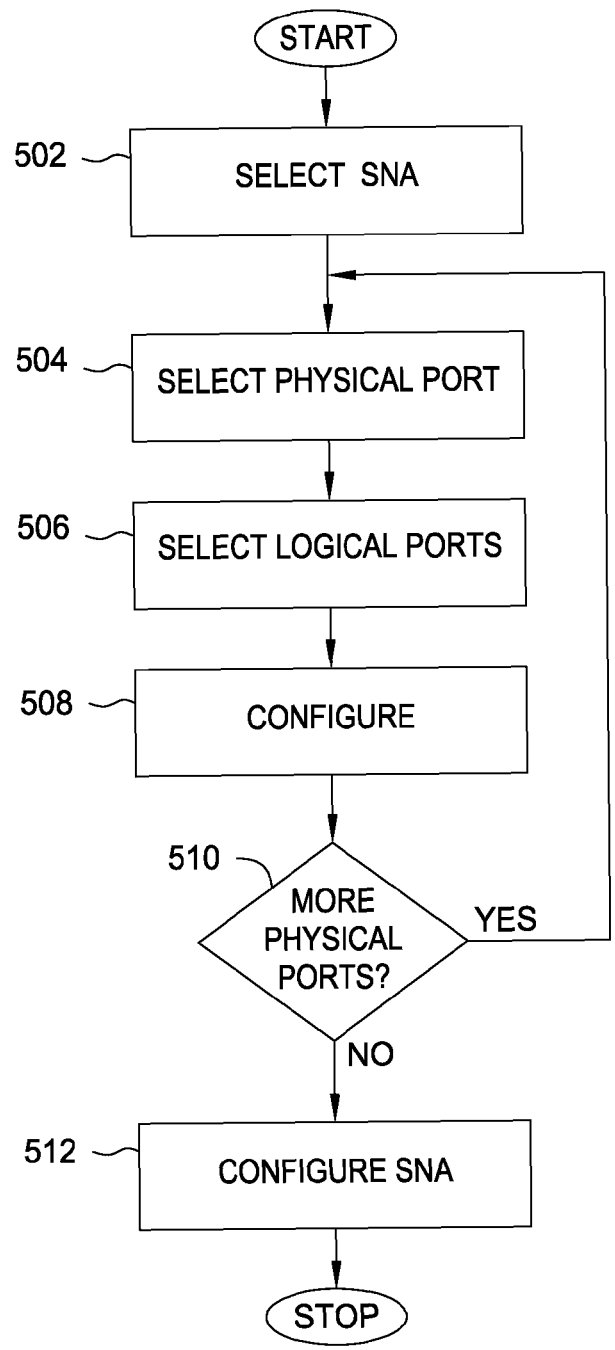
FIG. 5 is a flowchart illustrating a method for configuring multiple partitions for a shared network adapter.

FIG. 5 is a flowchart 500 illustrating a method for configuring multiple partitions for a shared network adapter 316. Reference will be made to elements introduced above and described with respect to FIGS. 3A-B. After partitioning a server 330 into one more LPARs 320, a server user may use a configuration manager 150 to configure an SNA 316 to handle network traffic for each LPAR 320.

At step 502, the user selects an SNA 316 for an LPAR 320. The LPAR 320 resides on a server 330. For example, a server 330 contains one or more SNAs 316. As shown in FIG. 3, server 330 contains only one SNA 316. However, according to one embodiment of the invention, a server 330 may contain more than one SNA 316.

Once configured, an LSA 340 handles network traffic for an LPAR 320 by sending and receiving traffic through a physical port 306. At step 504, the user selects one of the physical ports 306 residing on the SNA 316 selected at step 502, to facilitate configuring an LSA 340.

According to one embodiment of the invention, configuration manager 150 displays GUI 160, presenting a list of all physical ports 306 on the SNA 316. For example, after selecting SNA 316 for LPAR 320A, the user selects physical port 306A to facilitate configuring an LSA 340A (shown in FIG. 3A).

The LSA 340 handles network traffic for an LPAR 320 via a logical port 308, which is assigned to the physical port selected at step 504. At step 506, the user selects a logical port 308 for the LSA 340. According to one embodiment of the invention, configuration manager 150 displays a GUI 160, which displays a list of all logical ports 308A associated with physical port 306A (as shown in FIG. 3B). The user may then select a logical port 308A.

At step 508, configuration manager 150 configures LSA 340 according to the physical port 306 and the logical port 308 selected in steps 504 and 506. For example, configuration manager 150 configures LSA 340A, containing logical port 308A, which is assigned to physical port 306A (as shown in FIG. 3B).

At step 510, the user decides whether to configure the LSA 340 for additional physical ports. If so, the process re-starts from step 504. For example, as shown in FIG. 3A, LSA 340A is connected to two physical ports 306A and 306B. When configuring LSA 340A, after assigning physical port 306A, the user would repeat steps 504-510 for physical port 306B.

At step 512, the user having decided not to assign additional physical ports to LSA 340, the configuration manager 150 configures SNA 316. For example, once LSA 340A is configured for physical ports 306A and 306B, configuration manager 150 configures SNA 316 such that LSA 340A is connected to LPAR 320A over two logical ports (as shown in FIG. 3A).

FIGS. 6A-10C illustrate various embodiments of the graphical user interface (GUI) 160, as implemented by configuration manager 150 for configuring server 330A as described in FIGS. 3A and 3B, according to one embodiment of the invention.

Figure 6A:
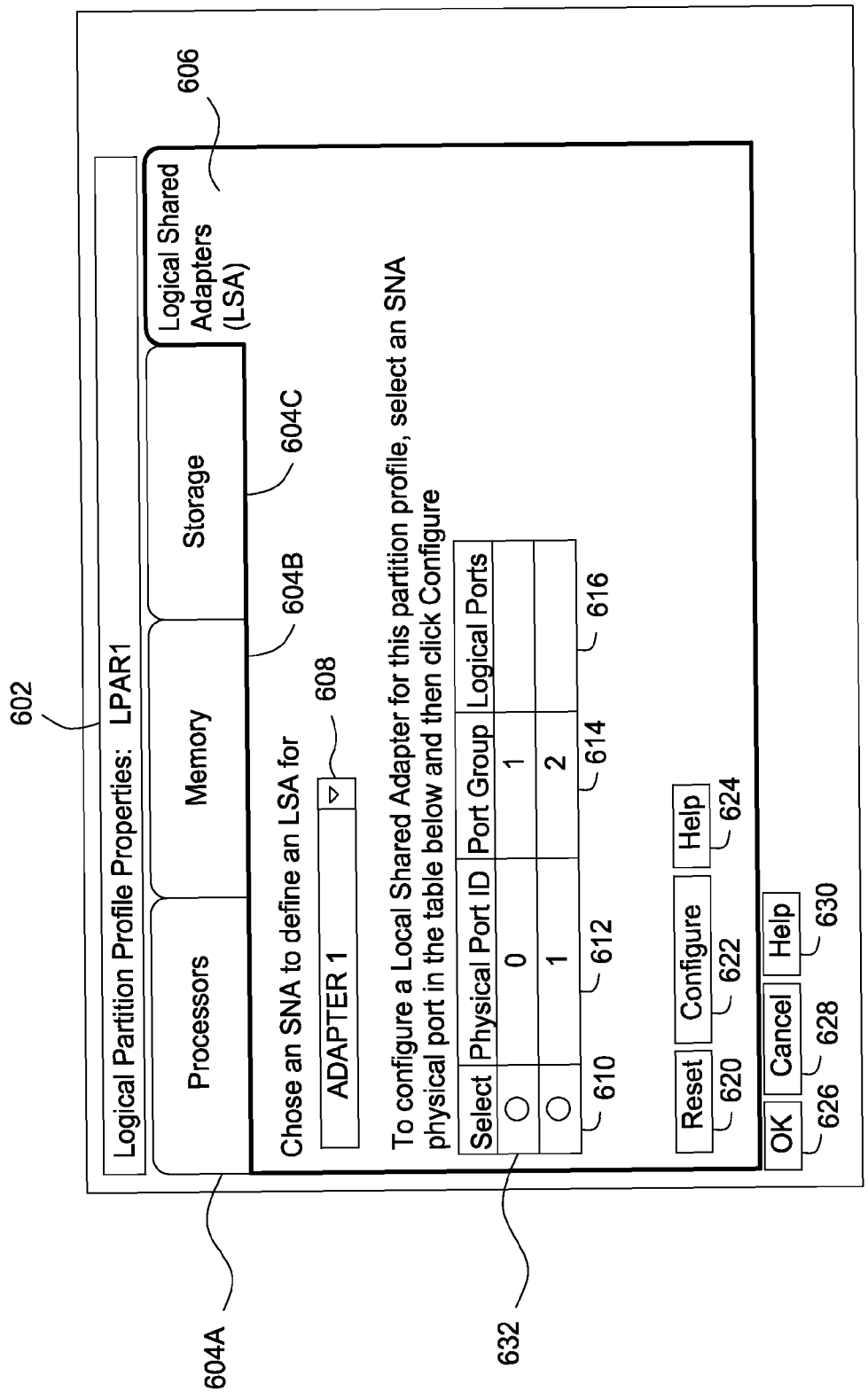
FIG. 6A illustrates a graphical user interface (GUI), according to one embodiment of the invention.
Figure 6B:
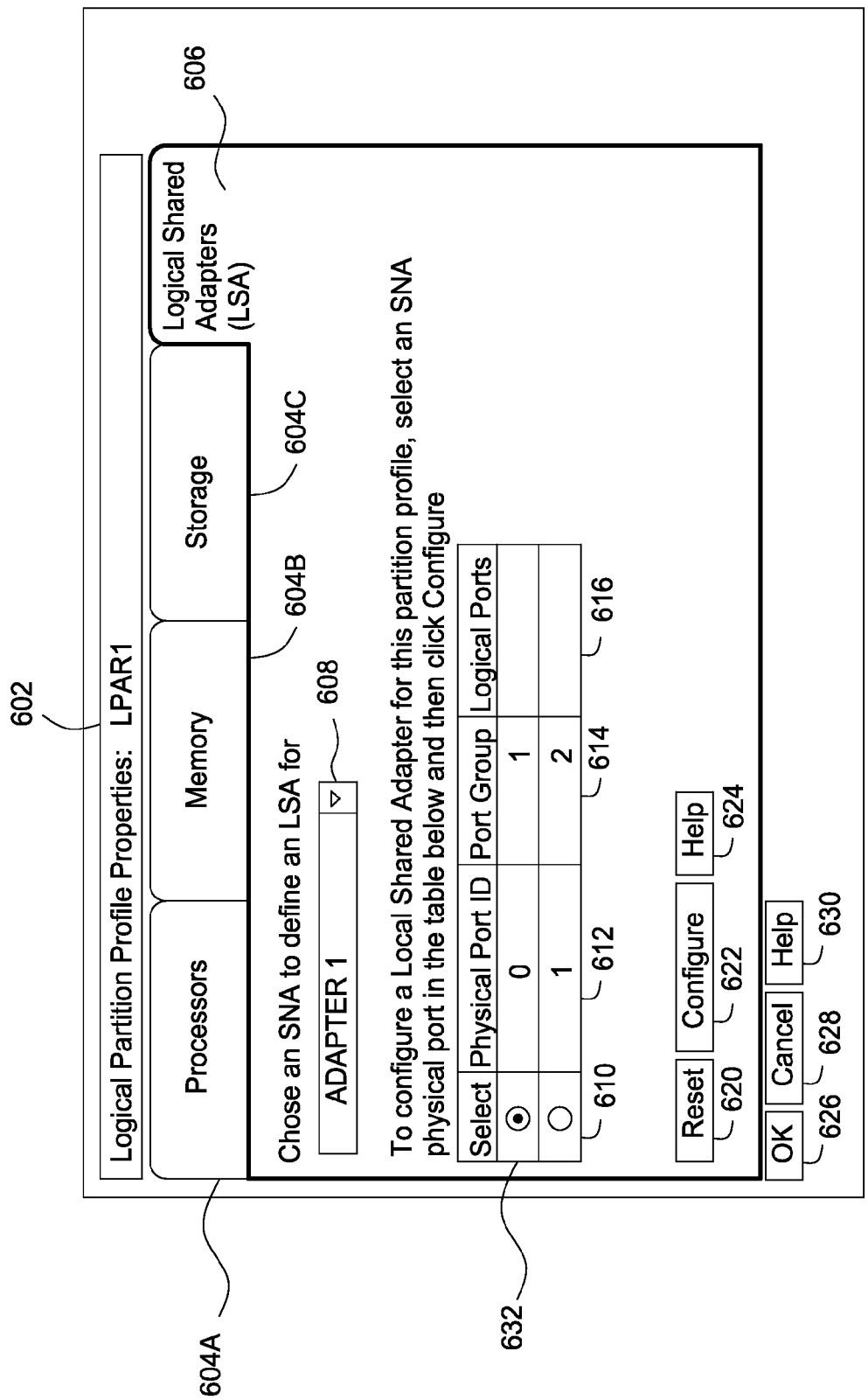
FIG. 6B illustrates a GUI, according to one embodiment of the invention.

The descriptions of FIGS. 6A-B describe the configuration of SNA 316 for a first partition 320A, as described in FIGS. 3A-B. FIG. 6A illustrates a first screen 600 of the GUI 160, according to one embodiment of the invention. GUI 160 contains partition ID element 602, partition tab elements 604A-C, LSA tab element 606, SNA selection element 608, physical port select element 610, physical port id element 612, port group id element 614, logical port ids element 616, reset button 620, configure button 622, help buttons 624 and 630, ok button 626, cancel button 628, and physical port identification display area 632. It should be noted that GUI 160 could be represented in one or more screens, according to the particular implementation of any one embodiment of the invention.

Typically, a user partitions a server by allocating resources to various logical partitions. Partition id element 602 identifies the current logical partition being allocated resources. Partition tab elements 604A-C, represent examples of some resources that a user may allocate. One skilled in the art recognizes that partition tab elements 604A-604C represent only a few of the possible resources within a server. The limited number allocated resources represented in tabs 604A-604C are not a fully inclusive list, and are limited for the sake of clarity.

According to one embodiment of the invention, selecting partition tab 606 executes configuration manager 150, which displays GUI 160. Partition tab 606 represents part of the partitioning process of server 330A. Allocating LSA 340 to LPAR 320 may take place anytime after LPAR 320 is created and SNA 316 is installed on server 330A.

SNA selection element 608 is a drop-down list for the user's selection of the SNA 316 installed on server 330A that is to be configured. As is shown, SNA selection element 608 is a drop-down list, but could be represented within other known or unknown GUI embodiments that are configured for user-selection of an SNA ID from one or more available SNA IDs, wherein each selectable SNA ID uniquely identifies a respective SNA 316 installed on the server 330A.

According to one embodiment of the invention, after the user selects an SNA ID, configuration manager 150 updates rows 632 on GUI 160. Each row 632 represents one physical port 306 on SNA 316. Row 632 includes a physical port select element 610, physical port id element 612, port group ID, 614, and logical port ids element 616. As is shown, physical port select element 610 is a radio button, but could be any known or unknown GUI selection element configured for user-selection of a physical port ID from one or more physical port IDs. According to one embodiment of the invention, if there is only one physical port 306, physical port select element 610 is pre-selected by populating physical port select element 610.

According to another embodiment of the invention, when only one SNA 316 is installed on server 330A, SNA selection element 608 is pre-populated with the SNA ID for the sole SNA 316, e.g., ADAPTER1; and row 632 is pre-populated for ADAPTER1, as described above. However, as is shown in FIG. 6A, two physical ports 306 reside on the SNA 316 identified as ADAPTER1.

According to one embodiment of the invention, the reset button 620 may be configured to de-select SNA selection ID, and remove rows 632 from GUI 160, in preparation for another SNA selection. Help button 624 may be configured to display help information regarding configuring LSA 320.

OK button 626 may be configured to commit the configuration specified in tab 606 to SNA 316. According to one embodiment of the invention, OK button 626 may be configured to store a profile describing the configuration specified in tab 606. Cancel button 628 may be configured to close the GUI 160. Help button 630 may be configured to display help information about configuring SNA 316.

Configure button 622 may be configured to display one or more logical port screens GUI 160 for configuring an LSA 340 for the physical port 306 selected from physical port identification display area 632 in physical port select element 610, as described below in the description of FIG. 7A. FIG. 6B shows GUI 160, with physical port select element 610 selected, indicating a configuration of an LSA 340 for LPAR 320A, identified herein as LPAR1.

According to one embodiment of the invention, a GUI 160 may include an 'Add LSA' button, enabling the user to configure multiple LSAs 340 for one LPAR 320. For example, a user could configure LSAs 340A1 and 340A2 for the LPAR 320A.

According to one embodiment of the invention, after a user presses the configure button 622 on the GUI 160 as described in FIG. 6B, the configuration manager 150 may display a GUI 160 as described in FIG. 7A. In FIG. 7A, the GUI 160 may display a table containing one row for each logical port 308 within the port group 304 containing physical port 306. (See FIG. 3B). Each row contains logical port selection element 702, logical port id element 704, owning logical partition id element 706, and state element 708. Logical port selection element 702 is a GUI radio button, configured to enable the user to select one logical port 308 for assignment to physical port 306. However, the logical port selection element 704 could be any GUI feature known or unknown that enables selection of a logical port ID from a plurality of logical port IDs. Logical port id element 704 uniquely identifies each logical port 308 within port group 304.

If a logical port 308 has already been assigned to a resource, e.g., another physical port 306, owning logical partition id element 706, uniquely identifies the LPAR 320 to which the logical port 308 is allocated, and State element 708 displays 'unavailable,' indicating that logical port 308 is not available to be assigned in the current configuration.

However, according to GUI 160 in FIG. 7A, physical port 306 associated with physical port ID, 0, contains 16 logical ports 308, each of which is available for assignment to LSA 320. According to one embodiment of the invention, where a logical port 308 is unavailable, select field 702 may be disabled to prevent assignment to the physical port 306.

The OK button 710 may be configured to assign the logical ports 308 associated with logical port IDs 704 to the physical port 306. The cancel button 712 may be configured to close GUI 160 as shown in FIG. 7A or 7B, and re-display GUI 160, as shown in FIG. 6B. The help button 712 may be configured to display useful information regarding assigning logical ports 308 to the physical port 306.

FIG. 7B illustrates the user selection of a logical port 308 identified as 7 for assignment to the physical port 306, e.g., physical port 306A. According to one embodiment of the invention, the user may press OK button 710 after the logical port selection, resulting in the configuration of LSA 340, such that the logical port 308 is assigned to the physical port 306. For example, LSA 340A may be configured such that the logical port 308A associated with the selected logical port ID 7 is assigned to physical port 306A. Then, configuration manager 150 may display GUI 160 according to the description in FIG. 8.

Figure 8:
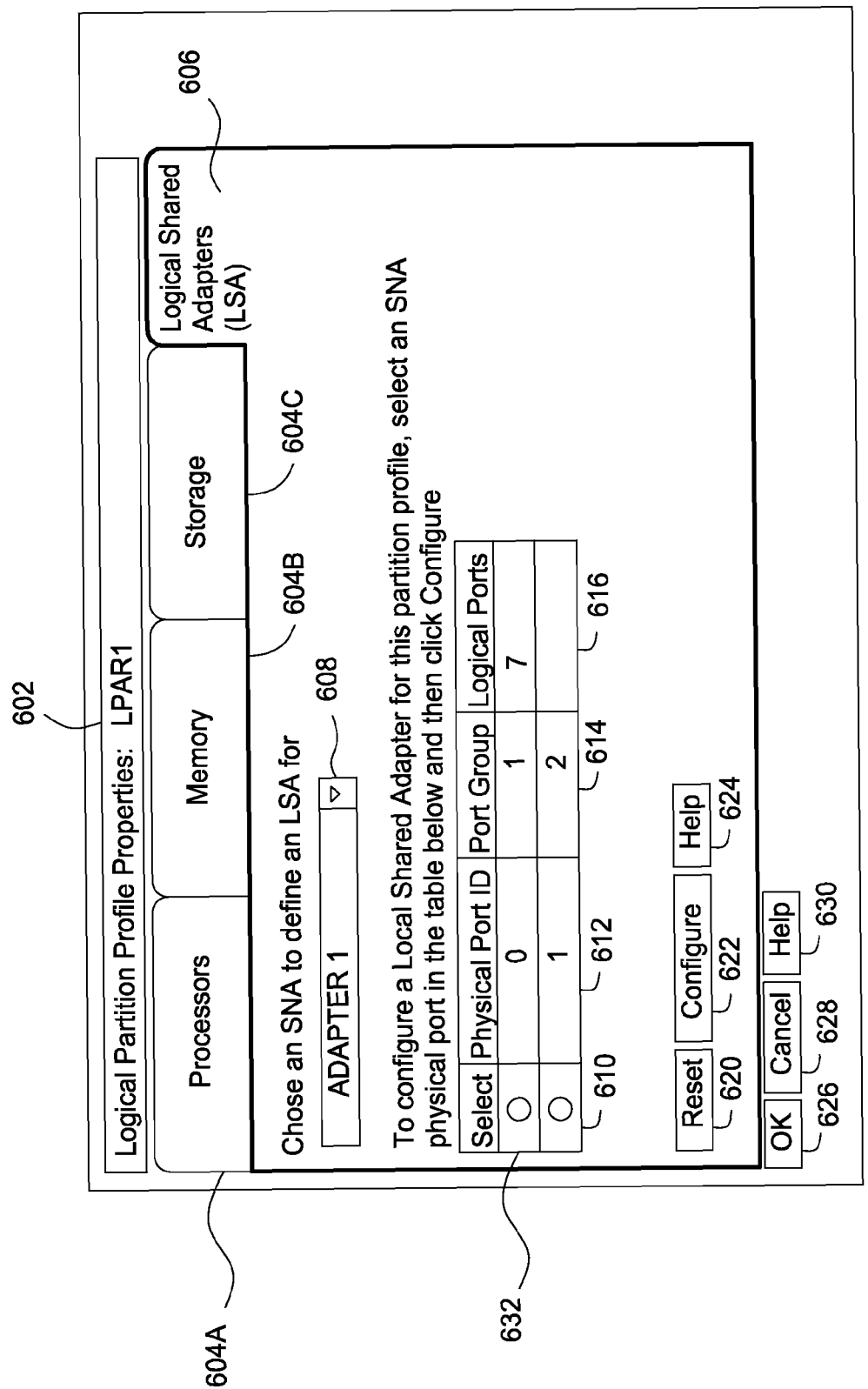
FIG. 8 illustrates a GUI, according to one embodiment of the invention.

FIG. 8 illustrates the GUI 160 after the LSA configuration described in FIGS. 7A-B, according to one embodiment of the invention. Logical port ids element 616 includes the logical port ID selected on the GUI 160, as described in FIG. 7B. By pressing the OK button 626, the user may configure the SNA 316 according to the LSA configuration described in FIGS. 7A-B. For example, as described in the preceding figures, the user may configure SNA 316A according to the configuration of LSA 340A. Alternatively, the user could configure the second physical port 306B, identified as '1' in Physical Port ID element 612, by selecting the respective physical port select element 610. According to one embodiment of the invention, the user then presses the configure button 622, and the process is repeated as described above in FIGS. 6B to 7B.

Figure 9:
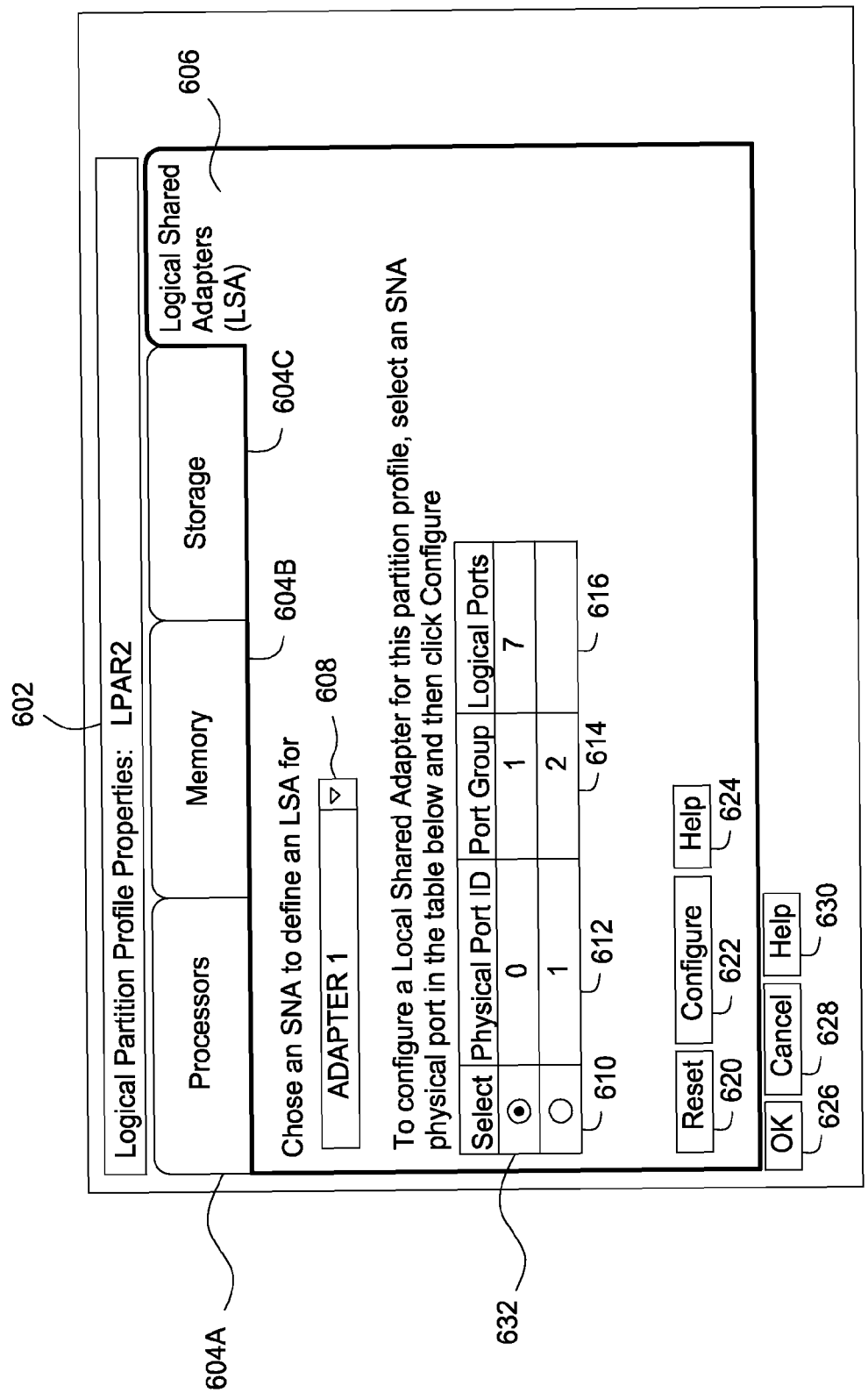
FIG. 9 illustrates a GUI, according to one embodiment of the invention.

FIGS. 9 and 10A-C illustrate configuring SNA 316 for a second partition 320B, as described in FIGS. 3A-B. FIG. 9 illustrates GUI 160 for LPAR2, the partition ID element 602 associated with LPAR 320B, after the user selects the row with a '1' in physical port ID element 612, associated with the physical port 306. After clicking on the configure button 622, GUI 160 is displayed as described in FIG. 10A.

Figure 10A:
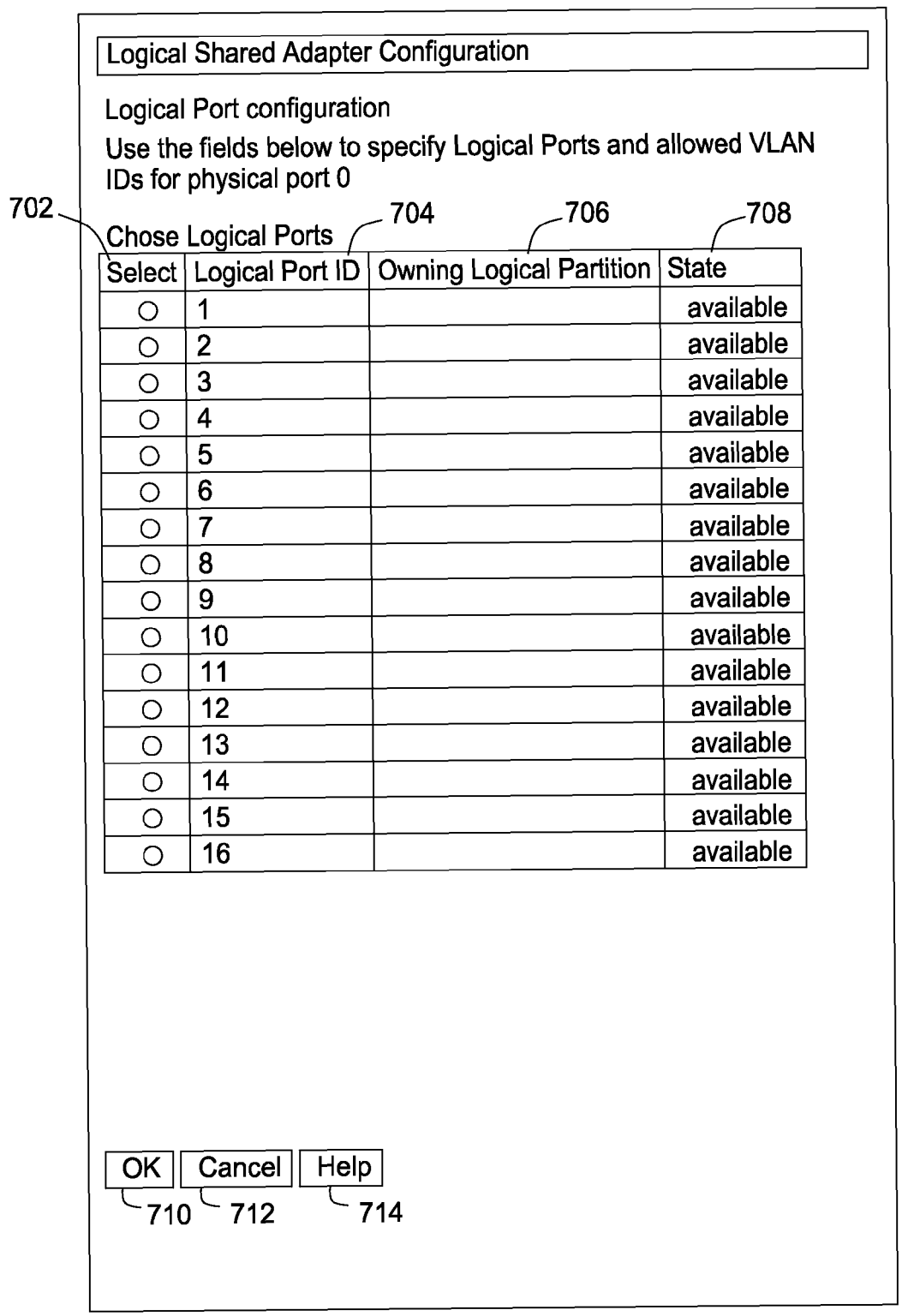
FIG. 10A illustrates a GUI, according to one embodiment of the invention.

FIG. 10A illustrates GUI 160 as described in FIG. 7A. FIG. 10B illustrates GUI 160 of FIG. 10A with user selections for logical port ID 12. According to one embodiment of the invention, in response to pressing the OK button 710, configuration manager 150 may assign logical port 308B associated with logical port ID 12 to physical port 306B, then display GUI 160 as described in FIG. 11.

Figure 11:
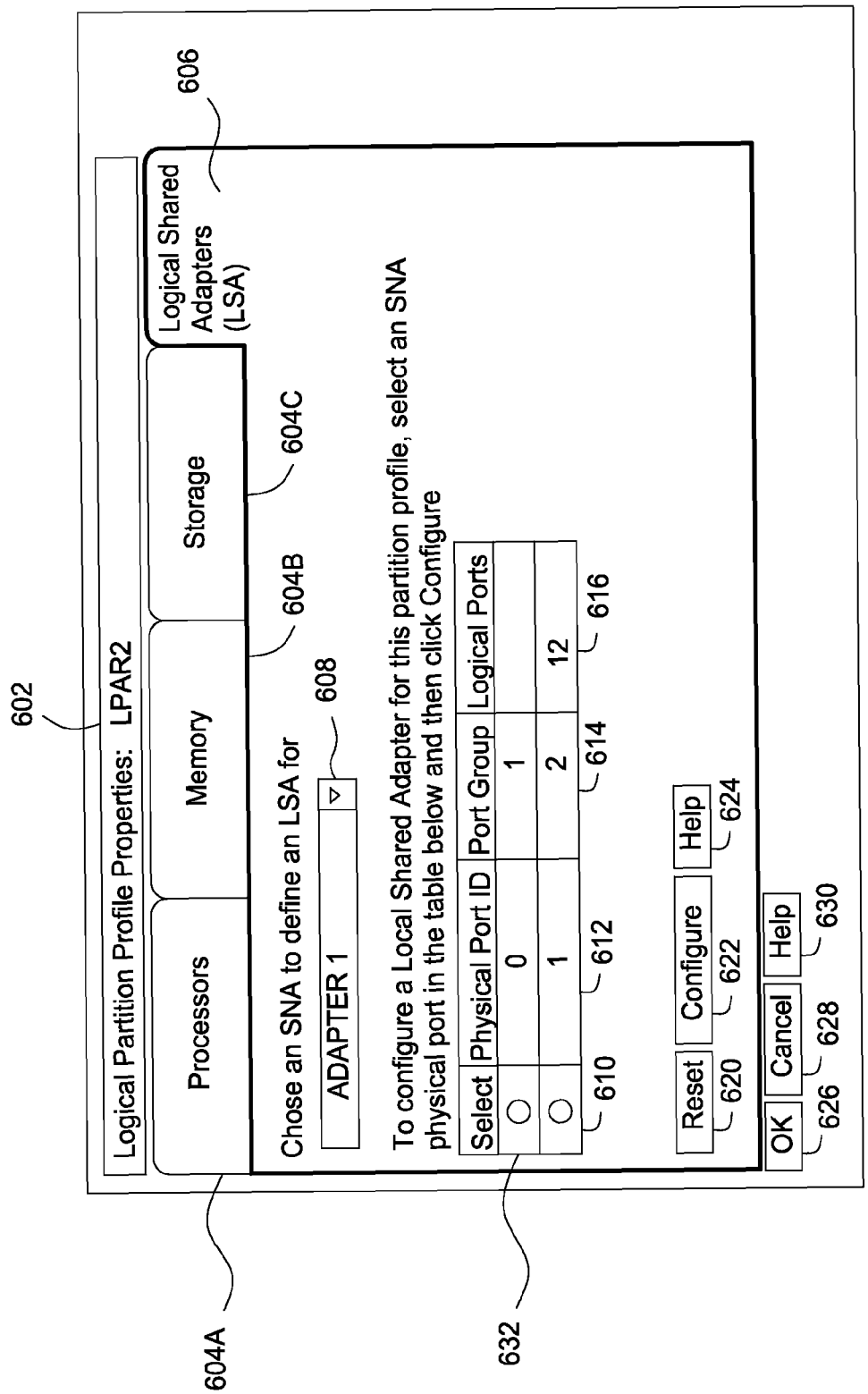
FIG. 11 illustrates a GUI, according to one embodiment of the invention.

FIG. 11 illustrates GUI 160 as described in FIG. 9B, although the logical port IDs element 616 is updated to reflect the logical port assignment described in FIG. 10B. Logical port IDs element 616 contains logical port ID 12. In response to clicking OK, configuration manager configures SNA 316, according to the configuration of LSA 340B.

Figure 12:
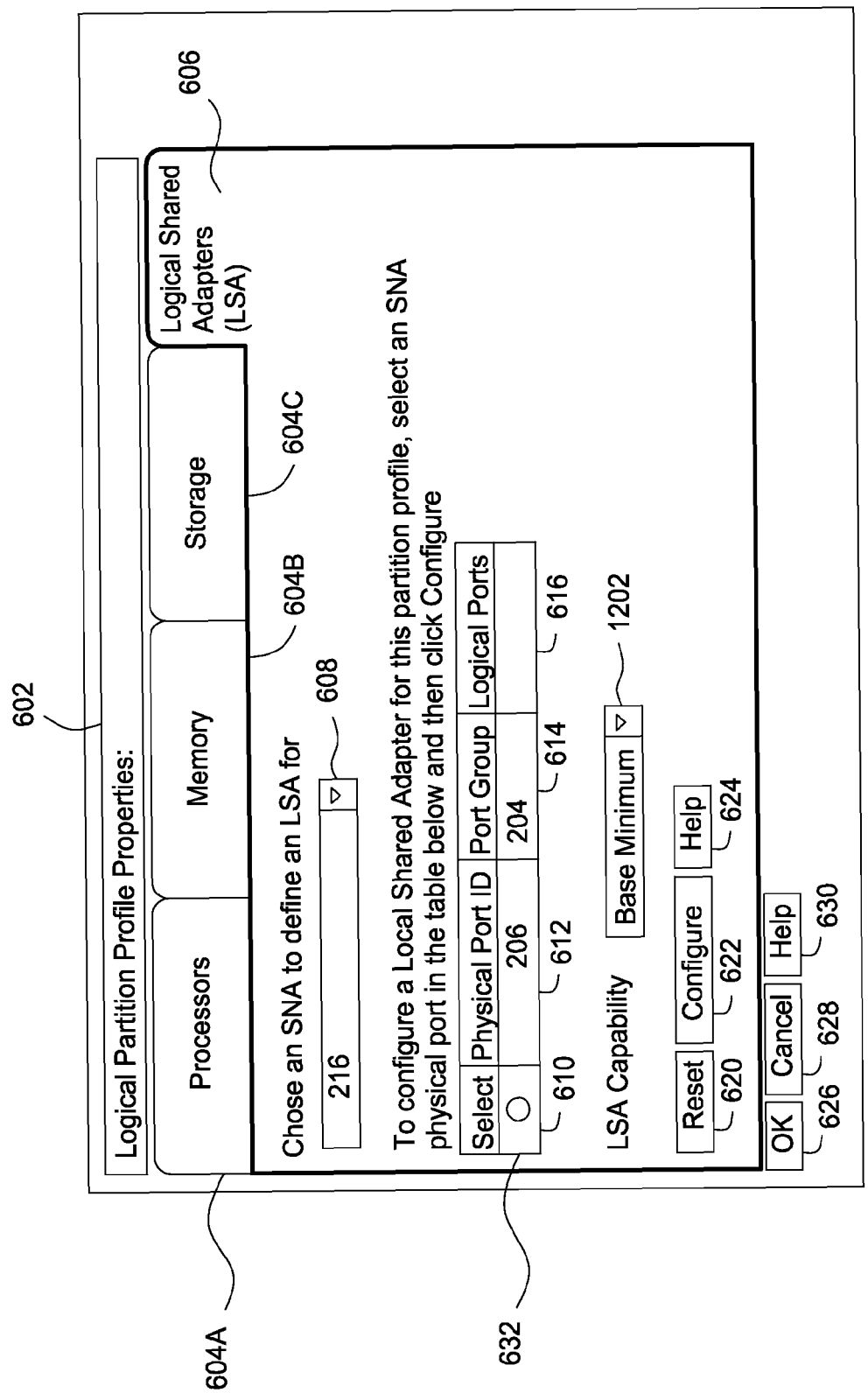
FIG. 12 illustrates a GUI, according to one embodiment of the invention.

FIG. 12 illustrates GUI 160, according to one embodiment of the invention. In addition to the features described in FIG. 6A, FIG. 12 contains LSA capability selection element 1202. According to one embodiment of the invention, in addition to selecting physical port 306 on SNA 316, a user may select a resource assignment level. The resource assignment level is associated with a capability selection element 1202 that may contain generic descriptions, such as, "Base Minimum, +Ten Percent, +Twenty Percent," etc. The LSA Capability element 1202 that a user selects may determine a specific portion of SNA resources that are dedicated to LSA 340.

FIG. 13 illustrates GUI 160, according to one embodiment of the invention. In addition to the features described in FIG. 7A, FIG. 13 includes functionality for assigning virtual lans (VLANs) to a logical port 308. A VLAN is similar in concept to the logical shared adapter 340. Within one physical network, e.g., a local area network (LAN), it is possible to define multiple virtual networks, or VLANs. In FIG. 13, GUI 160 includes an allow all VLANs check-box 1302. Selecting allow all VLANs check-box 1302 indicates that the logical port 306 associated with the selected logical port id is allowed to access all VLANs on network 132.

GUI 160 also includes an add vlan entry field 1304, an add VLAN button 1306, and a remove VLAN button 1308, for managing a VLAN list 1310. A user may enter VLAN IDs in the add vlan entry field 1304, then press add VLAN button 1306. In response, GUI 160 displays the added VLAN ID to the display box in VLAN list 1310. By selecting a VLAN ID within VLAN list 1310, a user may then press remove VLAN 1308, in response to which, GUI 160 will remove the selected VLAN ID from the display box in VLAN list 1310. According to one embodiment of the invention, when a user presses the allow all VLANs check-box 1302, the configuration manager 150 populates the VLAN list 1310 on the GUI 160 with VLAN IDs for all known VLANs on network 132.

After a user presses OK button 710, the configuration manager 150 may assign all VLANs in the VLAN list 1310 to the selected logical port 308. In turn, after the user presses the OK button 626 in GUI 160, the configuration manager 150 may enable logical port 306 to access all VLANs associated with all the VLAN IDs in VLAN list 1310.

While the foregoing is directed to embodiments of the present invention, other and further embodiments of the invention may be devised without departing from the basic scope thereof, and the scope thereof is determined by the claims that follow.

What is claimed is:

1. A computer program product, comprising:
  a computer readable storage medium having computer readable program code embodied therewith, the computer readable program code comprising:
  computer readable program code to output for display one or more screens for configuring a logical partition (LPAR) having allocated resources residing on a server computer, the one or more screens comprising:
    a shared network adapter (SNA) selection element indicating a selected SNA ID, wherein the SNA selection element is configured to display a plurality of available SNA IDs and to receive a user selection of one of the plurality of available SNA IDs, wherein each of the plurality of SNA IDs uniquely identifies a respective SNA installed on the server computer;
    a physical port selection element configured for user-selection of a physical port ID from one or more physical port IDs each corresponding to a respective physical port, wherein the one or more physical port IDs uniquely identify all physical ports residing on the respective SNA for the selected SNA ID; and
    an active configure button which, when selected by a user, causes one or more screens for configuring a logical shared adapter (LSA) associated with the respective SNA to be output for display, wherein the LSA manages the sending and receiving of network traffic by the LPAR through the SNA on the respective one or more physical ports corresponding to the selected one or more physical port IDs.

2. The computer program product of claim 1 wherein the SNA selection element is a GUI drop-down list and the physical port selection element is a GUI radio button.

3. The computer program product of claim 1, the one or more screens further comprising:
  an active OK button which, when selected by a user causes a configuration of:
    the LPAR according to the selected SNA ID; and
    the respective SNA, according to the LSA.

4. The computer program product of claim 3, the one or more screens further comprising:
  an LSA capability selection element configured for user selection of a resource assignment level, wherein the resource assignment level describes a bandwidth level allocation for the LSA; and when the user selects the active OK button further causes a configuration of the LSA according to the selected resource assignment level.

5. The computer program product of claim 4, the one or more screens further comprising:
  a plurality of logical port ID selection elements configured for user selection of a logical port ID from a plurality of logical port IDS, wherein the plurality of logical port IDs uniquely identifies all logical ports associated with the respective physical port for the selected physical port ID; and wherein the selection of the active OK button further causes a configuration of the LSA according to the selected logical port ID and the respective physical port.

6. The computer program product of claim 1, the one or more screens further comprising:
a plurality of logical port ID selection elements configured for user selection of a logical port ID from a plurality of logical port IDs, wherein the plurality of logical port IDs uniquely identify all logical ports associated with the physical port.

7. The computer program product of claim 6, the one or more screens further comprising:
an active OK button which, when selected by a user causes a configuration of:
the LPAR according to the selected SNA ID;
the respective SNA according to the LSA; and
the LSA according to the selected logical port ID and the respective physical port.

8. The computer program product of claim 6 wherein the plurality of logical port ID selections elements is a plurality of GUI radio buttons.

9. A computer program product, comprising:
a computer readable storage medium having computer readable program code embodied therewith, the computer readable program code comprising:
computer readable program code to output for display one or more screens for configuring a logical shared adapter (LSA), the one or more screens comprising:
a shared network adapter (SNA) selection element indicating a selected SNA ID, wherein the SNA selection element is configured to display a plurality of available SNA IDs and to receive a user selection of one of the plurality of available SNA IDs, wherein each of the plurality of SNA IDs uniquely identifies a respective SNA, and wherein the LSA manages sending and receiving of network traffic by a logical partition (LPAR) through the SNA associated with the selected SNA ID;
a plurality of logical port ID selection elements configured for user selection of a logical port ID from a plurality of logical port IDs, wherein the plurality of logical port IDs uniquely identifies all logical ports associated with a physical port residing on the SNA associated with the selected SNA ID; and
an active OK button which, when selected by a user causes a configuration of the LSA according to the selected logical port ID and the physical port, whereby the LSA manages the sending and receiving of network traffic by the LPAR on any of the logical ports through the associated physical port residing on the SNA associated with the selected SNA ID.

10. The computer program product of claim 9, the one or more screens further comprising:
a virtual lan (VLAN) entry field configured for user entry of one or more VLAN IDs each associated with a respective VLAN of a plurality of VLANs associated with the server, wherein the active OK button, when selected by a user further causes a configuration of the LSA according to the entered VLAN IDs and selected logical port ID.

11. The computer program product of claim 9 wherein the plurality of logical port id selection elements is a plurality of GUI radio buttons.

12. A method of configuring a logical partition (LPAR), comprising:
displaying a graphical user interface (GUI) for configuring an LPAR having allocated resources residing on a server computer;
receiving user input selecting a shared network adapter (SNA) ID from a plurality of available SNA IDs displayed in an SNA selection screen area of the GUI, wherein each selectable SNA ID uniquely identifies a respective SNA installed on the server computer;
providing a graphical indication of the selected SNA ID;
receiving user input selecting a physical port ID from one or more physical port IDs, each corresponding to a respective physical port, displayed in a physical port selection screen area of the GUI, wherein the one or more physical port IDs uniquely identify all physical ports residing on the respective SNA for the selected SNA ID;
receiving user input selecting an active configure button; and
in response to the received selection of the active configure button, outputting for display one or more screens of the GUI for configuring a logical shared adapter (LSA) associated with the respective SNA, wherein the LSA manages the sending and receiving of network traffic by the LPAR through the SNA on the respective one or more physical ports corresponding to the selected one or more physical port IDs.

13. The method of claim 12 wherein the SNA selection element is a GUI drop-down list and the physical port selection element is a GUI radio button.

14. The method of claim 12, further comprising:
receiving user input selecting an active OK button; and
in reponse to selection of the active OK button, causing a configuration of:
the LPAR, according to the selected SNA ID; and
the respective SNA, according to the LSA.

15. The method of claim 14, further comprising:
receiving user input selecting a logical port ID from a plurality of logical port IDs displayed in a logical port ID selection screen area of the GUI, wherein the plurality of logical port IDs identifies all logical ports associated with the respective physical port for the selected physical port ID;
receiving user input selecting an active OK button; and
in response to selection of the active OK button, further causing a configuration of the LSA according to the selected logical port ID and the respective physical port.

16. The method of claim 14 wherein the plurality of logical port id selection elements are GUI check-boxes.

17. The method of claim 14, further comprising:
receiving user input selecting an LSA capability selection element displayed in an LSA capability selection screen area of the GUI, wherein in response to the selection of the active OK button, further causes a configuration of the LSA, according to the selected resource assignment level.

18. The method of claim 17, further comprising:
receiving user input selecting a logical port ID from a plurality of logical port IDs displayed in a logical port ID selection screen area of the GUI, wherein the plurality of logical port IDs identifies all logical ports associated with the respective physical port for the selected physical port ID;
receiving user input selecting an active OK button; and
in response to selection of the active OK button, further causing a configuration of the LSA according to the selected logical port ID and the respective physical port.

19. The method of claim 18 further comprising:
receiving user input of one or more vitual lan (VLAN) IDs displayed in a VLAN entry screen area of the GUI, wherein the one or more VLAN IDs are associated with a plurality of VLANs associated with the server, and wherein in response to the selection of the active OK button, the LSA is configured further according to the entered VLAN IDs and the selected logical port ID.

20. An apparatus for configuring a logical partition (LPAR), the apparatus comprising:
a processor; and
a memory containing a GUI application, which when executed by the processor displays one or more screens for configuring an LPAR having allocated resources residing on a server computer, the LPAR being uniquely identified by a partition ID; the one or more screens comprising:
  a shared network adapter (SNA) selection element indicating a selected SNA ID, wherein the SNA selection element is configured to display a plurality of available SNA IDs and to receive a user selection of one of the plurality of available SNA IDs, wherein each of the plurality of SNA IDs uniquely identifies a respective SNA installed on the server computer;
  a physical port selection element configured for user-selection of a physical port ID from one or more physical port IDs each corresponding to a respective physical port, wherein the one or more physical port IDs uniquely identify all physical ports residing on the respective SNA for the selected SNA ID; and
  an active configure button which, when selected by a user, causes one or more screens for configuring a logical shared adapter (LSA) associated with the respective SNA to be output for display, wherein the LSA manages the sending and receiving of network traffic by the LPAR through the SNA on the respective one or more physical ports corresponding to the selected one or more physical port IDs.

* * * * *